(12) United States Patent
Sasada et al.

(10) Patent No.: US 8,820,909 B2
(45) Date of Patent: Sep. 2, 2014

(54) BLACK INK COMPOSITION, INK SET, AND IMAGE FORMING METHOD

(75) Inventors: Misato Sasada, Kanagawa (JP); Jun Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 313 days.

(21) Appl. No.: 13/426,618

(22) Filed: Mar. 22, 2012

(65) Prior Publication Data

US 2012/0249701 A1   Oct. 4, 2012

(30) Foreign Application Priority Data

Mar. 29, 2011   (JP) ................. 2011-073459

(51) Int. Cl.
*B41J 2/01*   (2006.01)
*C09D 11/00*   (2014.01)
*B41J 2/21*   (2006.01)
*C09D 11/10*   (2014.01)
*B41J 11/00*   (2006.01)

(52) U.S. Cl.
CPC ............. *C09D 11/324* (2013.01); *B41J 2/2107* (2013.01); *B41J 11/002* (2013.01); *C09D 11/101* (2013.01); *C09D 11/40* (2013.01); *C09D 11/54* (2013.01)
USPC .............................. 347/100; 347/95; 347/102

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC .......... 347/100, 95, 96, 88, 99, 102, 105, 103, 347/20, 21, 9; 106/31.6, 31.13, 31.27; 523/160, 161
See application file for complete search history.

(56) References Cited

U.S. PATENT DOCUMENTS

| | | |
|---|---|---|
| 6,428,862 B1 | 8/2002 | Noguchi |
| 2002/0064603 A1* | 5/2002 | Noguchi .................. 427/466 |
| 2002/0077385 A1 | 6/2002 | Miyabayashi |
| 2005/0250869 A1* | 11/2005 | Claes et al. ................ 522/71 |
| 2008/0017066 A1* | 1/2008 | Bauer et al. ............... 106/31.6 |
| 2008/0242773 A1 | 10/2008 | Ushirogouchi et al. |
| 2009/0085996 A1* | 4/2009 | Kasai ........................ 347/100 |
| 2009/0169748 A1 | 7/2009 | House et al. |
| 2011/0057984 A1 | 3/2011 | Kuwabara et al. |
| 2011/0249055 A1* | 10/2011 | Sasada et al. ................ 347/20 |
| 2013/0050366 A1* | 2/2013 | Sasada et al. ............... 347/100 |

FOREIGN PATENT DOCUMENTS

| | | |
|---|---|---|
| JP | 2002-265816 | 9/2002 |
| JP | 2004-027211 A | 1/2004 |
| JP | 2004-204240 | 7/2004 |
| JP | 2005-178331 A | 7/2005 |
| JP | 2008-184546 | 8/2008 |
| JP | 2009-190379 | 8/2009 |
| JP | 2011-057790 | 3/2011 |

OTHER PUBLICATIONS

English language translation of the following: Office action dated Jun. 4, 2013 from the JPO in a Japanese patent application corresponding to the instant patent application. This office action translation is submitted now in order to supplement the understanding of patent document JP2008-184546, JP2002-265816, JP204240, JP2011-0577920 and JP2009-190379 which are cited in the office action and are being disclosed in the instant Information Disclosure Statement.

Extended European Search Report dated Jul. 17, 2012 issued in corresponding EP Application No. 12161464.8.

* cited by examiner

*Primary Examiner* — Manish S Shah

(74) *Attorney, Agent, or Firm* — SOLARIS Intellectual Property Group, PLLC

(57) ABSTRACT

A black ink composition includes a resin-coated carbon black containing a water-soluble resin and carbon black, a water-soluble polymerizable compound, a polymerization initiator, and water, wherein an average primary particle diameter of the carbon black is 20 nm or more, and an absorbance ratio of absorbance at a wavelength of 350 nm with respect to absorbance at a wavelength of 600 nm (absorbance at a wavelength of 350 nm/absorbance at a wavelength of 600 nm), when the black ink composition is diluted 5,000-fold with water, is 1.9 or lower.

11 Claims, No Drawings

BLACK INK COMPOSITION, INK SET, AND IMAGE FORMING METHOD

CROSS-REFERENCE TO RELATED APPLICATION

This Application claims priority under 35 USC 119 from Japanese Patent Application No. 2011-073459, filed on Mar. 29, 2011, the disclosure of which is incorporated by reference herein.

BACKGROUND OF THE INVENTION

1. Field of Invention

The present invention relates to a black ink composition, an ink set, and an image forming method.

2. Description of the Related Art

Ultraviolet curable pigment inks have been developed as inks for inkjet recording (see, for example, Japanese Patent Application Laid-Open (JP-A) Nos. 2004-027211 and 2005-178331). Basically, in ultraviolet curable pigment inks, a pigment is used as a colorant for the purpose of improving the weathering resistance of an image, and a polymerizable compound and a polymerization initiator are included for the purpose of improving the fixing property of an image. When an ultraviolet curable pigment ink is black, carbon black is generally used as a colorant.

SUMMARY OF THE INVENTION

However, while carbon black has high absorbance in the ultraviolet region, in an ultraviolet curable pigment ink containing carbon black, the decomposition ratio of the polymerization initiator contained in the ink may be low in some cases, and as a result, there are cases in which neither the curing sensitivity of the ink nor the fixing property of an image are favorable. These problems are not addressed by JP-A Nos. 2004-027211 and 2005-178331.

Further, the ultraviolet curable pigment inks described in JP-A Nos. 2004-027211 and 2005-178331 are non-aqueous pigment inks. From the viewpoint of reduction of environmental load, aqueous pigment inks are preferable.

The present invention has been made in view of the above circumstances and provides a black ink composition, an ink set, and an image forming method.

According to a first aspect of the invention, there is provided a black ink composition including a resin-coated carbon black containing a water-soluble resin and carbon black, a water-soluble polymerizable compound, a polymerization initiator, and water, wherein an average primary particle diameter of the carbon black is 20 nm or more, and an absorbance ratio of absorbance at a wavelength of 350 nm with respect to absorbance at a wavelength of 600 nm (absorbance at a wavelength of 350 nm/absorbance at a wavelength of 600 nm), when the black ink composition is diluted 5,000-fold with water, is 1.9 or lower.

According to a second aspect of the invention, there is provided an ink set including:

the black ink composition according to the first aspect of the invention; and a treatment liquid including an aggregating agent that is capable of forming an aggregate when contacting the black ink composition.

According to a third aspect of the invention, there is provided an image forming method including:

providing the ink set according to the second aspect of the invention;

applying the treatment liquid in the ink set onto a recording medium;

applying the black ink composition in the ink set onto the recording medium by an inkjet method; and irradiating the black ink composition applied onto the recording medium with an actinic energy ray.

DETAILED DESCRIPTION OF THE INVENTION

Hereinafter, exemplary embodiments of the present invention are described in detail. However, the present invention is not limited thereto and can be modified in various ways within the spirit and scope of the present invention.

In this specification, a numerical range expressed with "to" represents a range including numerical values described in front of and behind "to", as the minimum value and the maximum value.

<Black Ink Composition>

The black ink composition of the invention (hereinafter, also referred to simply as "ink composition" or "ink") includes a resin-coated carbon black containing a water-soluble resin and carbon black, a water-soluble polymerizable compound, a polymerization initiator, and water. The black ink composition of the invention may further include other components, as necessary.

In the black ink composition of the invention, the carbon black included in the resin-coated carbon black has an average primary particle diameter of 20 nm or more, and an absorbance ratio of the absorbance at a wavelength of 350 nm with respect to the absorbance at a wavelength of 600 nm (absorbance at a wavelength of 350 nm/absorbance at a wavelength of 600 nm), when the black ink composition is diluted 5,000-fold with water, is 1.9 or lower.

When a black ink composition having such a configuration is cured by irradiation with an actinic energy ray, an image having excellent rub-off resistance and excellent adhesion to recording media can be formed.

The black ink composition of the invention is suitable for inkjet recording.

[Resin-Coated Carbon Black]

The black ink composition of the invention includes at least one resin-coated carbon black containing a water-soluble resin and carbon black having an average primary particle diameter of 20 nm or more. In the resin-coated carbon black, at least one portion of a surface of the carbon black is covered with the water-soluble resin.

(Carbon Black)

Basic properties of the carbon black (hereinafter, may be referred to as "carbon black pigment") that forms a part of the resin-coated carbon black include primary particle diameter, specific surface area, structure, surface chemical properties, and the like, and it is preferable to select a carbon black having appropriate properties depending on the intended use.

The carbon black that forms a part of the resin-coated carbon black has an average primary particle diameter of 20 nm or more.

The absorbance in the ultraviolet region of a carbon black having an average primary particle diameter of 20 nm or more is lower than that of a carbon black having an average primary particle diameter of less than 20 nm. Therefore, a carbon black having an average primary particle diameter of 20 nm or more is less likely to interfere with the decomposition of the polymerization initiator due to actinic energy rays (in particular, ultraviolet rays).

Accordingly, when the black ink composition of the invention is used, an image having excellent rub-off resistance and excellent adhesion to recording media can be formed without using an additional additive or limiting the polymerization initiator to a specific compound in order to enhance the curing sensitivity of the ink. When the average primary particle diameter of the carbon black is less than 20 nm, there are cases in which the curing sensitivity of the ink composition is low and, as a result, an image having excellent rub-off resistance and excellent adhesion to recording media cannot be formed.

The average primary particle diameter of the carbon black is preferably 25 nm or more, from the viewpoint of realizing formation of an image having excellent rub-off resistance and excellent adhesion to recording media.

The upper limit of the average primary particle diameter of the carbon black is not particularly limited, but is preferably less than 80 nm, more preferably 70 nm or less, and even more preferably 60 nm or less, from the viewpoint of the dispersion stability of the resin-coated carbon black in the ink and from the viewpoint of achieving an excellent film forming property of the ink on a recording medium and excellent rub-off resistance.

The average primary particle diameter of the carbon black pigment is preferably 20 nm or more but less than 80 nm, more preferably from 20 nm to 70 nm, even more preferably from 20 nm to 60 nm, and particularly preferably from 25 nm to 60 nm.

The average primary particle diameter of the carbon black is determined by measuring particle diameters (equivalent circular diameters) of 1,000 primary particles which are arbitrarily selected from an image photographed using a transmission electron microscope (TEM), JEM-2010 (trade name, manufactured by JEOL Ltd.) (at an acceleration voltage of 200 kV), and calculating the arithmetic mean.

The BET specific surface area of the carbon black is not particularly limited, but is preferably 150 $m^2/g$ or less. When the BET specific surface area is 150 $m^2/g$ or less, rub-off resistance of the image is excellent.

Further, the lower limit of the BET specific surface area is preferably 30 $m^2/g$ or more, from the viewpoints of print density and storage stability of ink.

From the viewpoints described above, the BET specific surface area is preferably from 30 $m^2/g$ to 150 $m^2/g$, and more preferably from 30 $m^2/g$ to 120 $m^2/g$.

Further, the BET specific surface area of the carbon black is measured in accordance with JIS K 6217, the disclosure of which is incorporated by reference herein.

The DBP (dibutyl phthalate) absorption of the carbon black is not particularly limited, but is preferably from 30 mL/100 g to 200 mL/100 g, and more preferably from 30 mL/100 g to 100 mL/100 g, from the viewpoints of color tone and print density.

Further, the DBP absorption of the carbon black is measured in accordance with method A of JIS K 6221, the disclosure of which is incorporated by reference herein.

Examples of the carbon black include those produced by a known method such as a contact method, a furnace method, or a thermal method. Specific examples thereof may include CONDUCTEX SC ULTRA, RAVEN 1200, RAVEN 1170, RAVEN 1000, RAVEN 1020, RAVEN 1080, RAVEN 1040, RAVEN 760 ULTRA, RAVEN 1060 ULTRA, RAVEN M, RAVEN 820, RAVEN 1100 ULTRA, RAVEN 860 ULTRA, and RAVEN 540 ULTRA (all trade names, manufactured by Columbian Chemicals Company), REGA 250R (trade name, manufactured by Cabot Corporation), COLOR BLACK FW2, COLOR BLACK S160, NIPEX 1601Q, NIPEX 60, PRINTEX 60, PRINTEX L, PRINTEX 55, PRINTEX U, SPECIAL BLACK 550, NIPEX 150, PRINTEX 150T, SPECIAL BLACK 4, PRINTEX 40, PRINTEX 45, PRINTEX 3, PRINTEX 30, PRINTEX 300, PRINTEX 200, PRINTEX 140U, PRINTEX 35, NIPEX 35, SPECIAL BLACK 350, SPECIAL BLACK 250, and PRINTEX 25 (all trade names, manufactured by Evonik-Degussa GmbH), and MA 600, #750B, #650B, No. 25, No. 33, No. 40, No. 45, No. 45L, No. 47, No. 52, MA 7, MA 8, MA 77, MA 11, MA 100, MA 230, MA 220, and MA 14 (all trade names, manufactured by Mitsubishi Chemical Corporation). However, the scope of the invention is not limited thereto.

The carbon blacks described above may be used alone, or two or more kinds of them may be used in combination.

The content ratio of the carbon black in the ink composition of the invention is not particularly limited, but is preferably from 0.5% by mass to 4% by mass, and more preferably from 1.5% by mass to 3.5% by mass, from the viewpoints of adhesion, rub-off resistance, and print density.

(Water-Soluble Resin)

The water-soluble resin that forms a part of the resin-coated carbon black covers the carbon black having an average primary particle diameter of 20 nm or more and stably disperses the carbon black in an aqueous medium. From the viewpoint of dispersion stability, it is preferable that, in the resin-coated carbon black, at least a portion of a surface of the carbon black is covered with a crosslinked water-soluble resin.

Here, the term "water-soluble" in the water-soluble resin means that the resin dissolves in distilled water at 25° C. at an amount of 2% by mass or more. It is preferable that the resin dissolves at an amount of 5% by mass or more, and it is more preferable that the resin dissolves at an amount of 10% by mass or more. Further, when the resin has a salt-forming group, it is preferred that the solubility of the resin in a state in which the salt-forming group is neutralized with an equivalent mole of base or acid falls within the above range.

Examples of the water-soluble resin include hydrophilic polymer compounds.

It is preferable to use, as the water-soluble resin, a water-soluble resin dispersant that disperses the carbon black in an aqueous medium.

Examples of the water-soluble resin include polyvinyls, polyurethanes, and polyesters. Among these, polyvinyls are preferable.

Further, a water-soluble resin having a functional group capable of being crosslinked by a crosslinking agent is preferable as the water-soluble resin. The functional group capable of being crosslinked is not particularly limited, and examples thereof include a carboxyl group and a salt thereof, an isocyanato group, and an epoxy group. From the viewpoint of improving dispersibility, a carboxyl group or a salt thereof is preferable, and a carboxyl group is particularly preferable.

It is preferable that the water-soluble resin having a carboxyl group is a copolymer obtained by copolymerization using a carboxyl group-containing monomer as a copolymerization component.

Examples of the carboxyl group-containing monomer include (meth)acrylic acid, β-carboxyethyl acrylate, fumaric acid, itaconic acid, maleic acid, and crotonic acid. Among them, (meth)acrylic acid and β-carboxyethyl acrylate are preferable from the viewpoints of crosslinking property and dispersion stability. Here, the (meth)acrylic acid means at least one of acrylic acid and methacrylic acid.

It is preferable that the copolymerization components include at least one hydrophobic monomer. Examples of the hydrophobic monomer include alkyl (meth)acrylate having from 1 to 20 carbon atoms, (meth)acrylate having an aromatic ring group such as benzyl (meth)acrylate or phenoxyethyl (meth)acrylate, as well as styrene and derivatives thereof.

There is no particular limitation regarding the synthesis method of the copolymer, but random polymerization of vinyl monomers is preferable from the viewpoint of dispersion stability.

The water-soluble resin is preferably a copolymer obtained by copolymerization using a carboxyl group-containing monomer and at least one of an alkyl (meth)acrylate having from 1 to 20 carbon atoms or a (meth)acrylate having an aromatic ring group. Above all, it is particularly preferable that the water-soluble resin is a copolymer obtained by copolymerization using at least (meth)acrylic acid and at least one of benzyl (meth)acrylate or phenoxyethyl (meth)acrylate (namely, a copolymer including at least a structural unit derived from (meth)acrylic acid and a structural unit derived from at least one of benzyl (meth)acrylate or phenoxyethyl (meth)acrylate).

From the viewpoint of dispersibility of the pigment, the acid value of the water-soluble resin before crosslinking is preferably from 50 mgKOH/g to 250 mgKOH/g, and more preferably from 50 mgKOH/g to 150 mgKOH/g. Further, the acid value of the water-soluble resin is measured by the method described in JIS Standards (JIS K 0070: 1992), the disclosure of which is incorporated by reference herein.

Further, the crosslinking ratio of the water-soluble resin is preferably from 1 mol % to 60 mol %, more preferably from 5 mol % to 50 mol %, and even more preferably from 10 mol % to 40 mol %, from the viewpoints of the dispersion stability of the pigment and the aggregation property of the ink. Here, the crosslinking ratio (mol %) refers to a value which is obtained according to the following equation.

Crosslinking ratio (mol %)=[Equivalent number of moles of the crosslinking agent that reacts with 1 mol of the polymer×100/Number of moles of the reactive group which is included in 1 mol of the polymer and can react with the crosslinking agent]

Here, the "equivalent number of moles of the crosslinking agent that reacts with 1 mol of the polymer" is a value obtained by multiplying the number of moles of the crosslinking agent that reacts with 1 mol of polymer by the number of reactive groups in one molecule of the crosslinking agent.

The weight average molecular weight of the water-soluble resin before crosslinking is preferably from 3,000 to 100,000, more preferably from 5,000 to 80,000, and even more preferably from 10,000 to 60,000, from the viewpoint of the dispersibility of the pigment.

Here, the weight average molecular weight of the water-soluble resin is a value of molecular weight measured by the differential refractometer detection with THF (tetrahydrofuran) as a solvent using a GPC analyzer equipped with columns TSKGEL GMHXL, TSKGEL G4000HXL, and TSKGEL G2000HXL (all trade names, manufactured by Tosoh Corporation), and is obtained in terms of polystyrene used as a reference material.

The resin-coated carbon black can be prepared, for example, by dispersing carbon black using the above water-soluble resin to prepare a carbon black covered with a water-soluble resin, and then crosslinking the water-soluble resin of the carbon black covered with the water-soluble resin with a crosslinking agent.

Specifically, a resin-coated carbon black in which at least a portion of a surface of carbon black is covered with the water-soluble resin can be produced, for example, by a production method including:

(i) mixing the carbon black, the above water-soluble resin (dispersant), an aqueous solution containing a basic substance, and an organic solvent which can dissolve or disperse the water-soluble resin, and subjecting the mixture to a dispersion treatment (a mixing and hydration process); and (ii) removing at least a portion of the organic solvent (a solvent removal process).

Preferably, a resin-coated carbon black in which at least a portion of a surface of carbon black is covered with the water-soluble resin that is crosslinked can be produced by a production method which further includes the following processes between the above processes (i) and (ii):

(iii) adding a crosslinking agent to the dispersion obtained by the above dispersion treatment, and heating the mixture to crosslink the water-soluble resin (a crosslinking process); and (iv) purifying the dispersion after crosslinking to remove impurities (a purifying process).

The above processes (i) to (iv) make it possible to produce a pigment dispersion in which the carbon black is finely dispersed and which has excellent storage stability.

More specifically, a pigment dispersion in which at least a portion of a surface of carbon black is covered with the water-soluble resin can be produced, for example, by the method described in JP-A No. 2009-190379.

In the black ink composition, a mass ratio oldie water-soluble resin to the carbon black [mass of water-soluble resin/mass of carbon black] is preferably from 0.30 to 0.80, from the viewpoint of ink stability.

The water-soluble resin may be used in combination with a non-water-soluble resin (for example, a non-water-soluble dispersant).

As the non-water-soluble resin, a water-insoluble resin having a hydrophobic structural unit and a hydrophilic structural unit may be used. The hydrophilic structural unit is preferably a structural unit having an acidic group, and more preferably a structural unit having a carboxyl group.

Examples of the non-water-soluble resin include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a vinyl acetate-maleic acid copolymer, and a styrene-maleic acid copolymer.

More specifically, the water-insoluble resins described, for example, in JP-A Nos. 2005-41994, 2006-273891, 2009-084494, 2009-191134, and the like may be suitably used also in the invention.

(Crosslinking Agent)

In the resin-coated carbon black, it is preferable that the water-soluble resin which covers the carbon black is crosslinked using a crosslinking agent.

The crosslinking agent is not particularly limited as long as it is a compound having two or more moieties that react with the water-soluble resin. In particular, from the viewpoint of having excellent reactivity with a carboxyl group, a compound having two or more epoxy groups (an epoxy compound having a functionality of two or higher) is preferable.

Specific examples of the crosslinking agent include ethylene glycol diglycidyl ether, polyethylene glycol diglycidyl ether, 1,6-hexanediol diglycidyl ether, diethylene glycol diglycidyl ether, dipropylene glycol diglycidyl ether, polypropylene glycol diglycidyl ether, and trimethylolpropane triglycidyl ether. Among these, polyethylene glycol diglycidyl ether, diethylene glycol diglycidyl ether, and trimethylolpropane triglycidyl ether are preferable.

A commercially available product may also be used as the crosslinking agent. Examples of the commercially available product which may be used include DENACOL EX-321, EX-821, EX-830, EX-850, and EX-851 (all trade names, manufactured by Nagase ChemteX Corporation).

The mole ratio of the crosslinking moieties (for example, an epoxy group) of the crosslinking agent to the moieties to be crosslinked (for example, a carboxyl group) of the water-soluble resin is preferably from 1:1 to 1:10, more preferably from 1:1 to 1:5, and most preferably from 1:1 to 1:1.5, from the viewpoints of the crosslinking reaction rate and the stability of the dispersion liquid after crosslinking.

[Polymerizable Compound]

The black ink composition of the invention contains at least one water-soluble polymerizable compound. By irradiating with an actinic energy ray (for example, radiation, light, electron beams, or the like), the water-soluble polymerizable compound is polymerized and cured.

The term "water-soluble" used herein means that the compound can dissolve in distilled water at least at a certain concentration. Specifically, it is preferable that the solubility of the compound in distilled water at 25° C. is 5% by mass or more, and more preferably 10% by mass or more. Further, it is preferred that the water-soluble polymerizable compound can dissolve in an aqueous ink composition (preferably, uniformly). Alternatively, the water-soluble polymerizable compound may be a compound that dissolves in an ink composition (preferably, uniformly) by adding a water-soluble organic solvent described below to raise the solubility.

It is preferable that the water-soluble polymerizable compound in the invention includes at least one selected from the group consisting of a compound having a (meth)acrylic ester structure in a molecule thereof and a compound having a (meth)acrylamide structure in a molecule thereof. It is more preferable that the water-soluble polymerizable compound in the invention includes at least one compound having a (meth)acrylamide structure in a molecule thereof. Here, the (meth)acrylic ester structure means at least one of a methacrylic ester structure and an acrylic ester structure, and the (meth)acrylamide structure means at least one of a methacrylamide structure and an acrylamide structure.

(Compound Having a (Meth)Acrylic Ester Structure in a Molecule Thereof)

The polymerizable compound having a (meth)acrylic ester structure in a molecule thereof is not limited as long as the polymerizable compound is soluble in water and has a (meth)acrylic ester structure in a molecule thereof.

The polymerizable compound having a (meth)acrylic ester structure in a molecule thereof is preferably a compound represented by the following Formula (M-1).

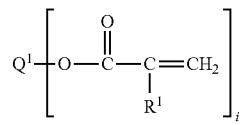

In Formula (M-1), $Q^1$ represents an i-valent linking group; $R^1$ represents a hydrogen atom or a methyl group; and i represents an integer of 1 or more.

The compound represented by Formula (M-1) is a compound in which an unsaturated monomer is bonded to the linking group $Q^1$ through an ester bond. $R^1$ represents a hydrogen atom or a methyl group, and preferably represents a hydrogen atom. The number represented by "i", which is the valency number of the linking group $Q^1$, is not limited, but is preferably 2 or higher, more preferably from 2 to 6, and even more preferably from 2 to 4.

The linking group $Q^1$ is not particularly limited as long as the linking group $Q^1$ is a group capable of linking with a (meth)acrylic ester structure, but it is preferable that the compound represented by Formula (M-1) be selected from linking groups that can satisfy the water-solubility described above. Specific examples thereof include residues obtained by removing at least one hydrogen atom or hydroxyl group from a compound selected from Compound group X below.

—Compound Group X—

Ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentyl glycol, pentaerythritol, dipentaerythritol and condensates thereof, polyols such as low-molecular weight polyvinyl alcohol and sugars, and polyamines such as ethylenediamine, diethylenetriamine, triethylenetetramine, polyethyleneimine and polypropylenediamine.

Further, examples of the linking group $Q^1$ include a substituted or unsubstituted alkylene chain having 4 or less carbon atoms such as a methylene group, an ethylene group, a propylene group, or a butylene group; and a functional group having a saturated or unsaturated heterocycle such as a pyridine ring, an imidazole ring, a pyrazine ring, a piperidine ring, a piperazine ring, or a morpholine ring.

As the linking group $Q^1$, among the above, a residue of polyol including an oxyalkylene group (preferably an oxyethylene group) is preferable, and a residue of polyol including three or more oxyalkylene groups (preferably an oxyethylene group) is particularly preferable.

Specific examples of the water-soluble polymerizable compound having a (meth)acrylic ester structure in a molecule thereof include the nonionic compounds shown below, but the present invention is not limited thereto.

Nonionic Compound 1

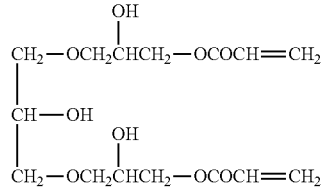

Nonionic Compound 2

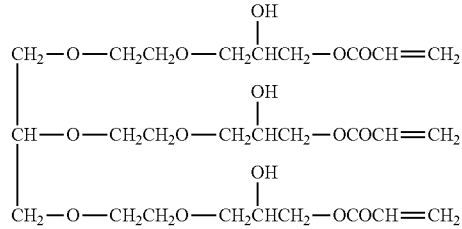

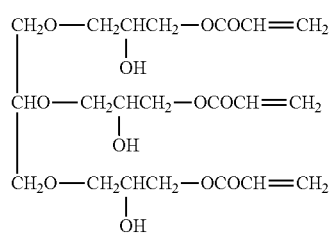

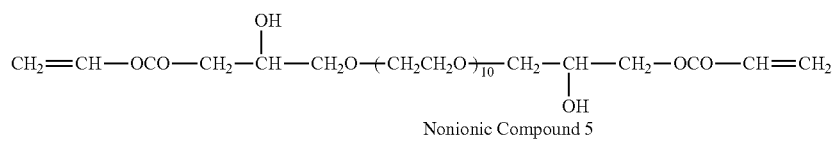

Nonionic Compound 3

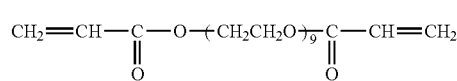

Nonionic Compound 4

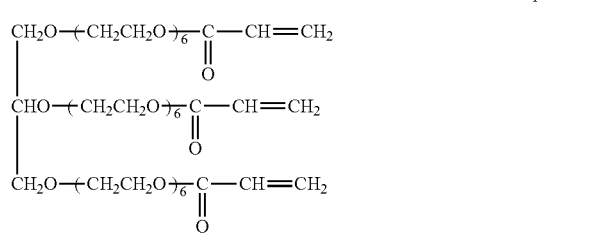

Nonionic Compound 5

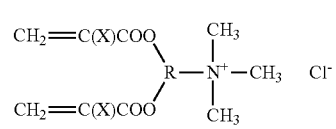

Nonionic Compound 6

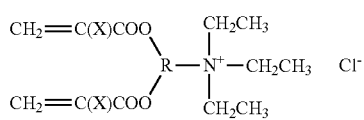

In addition, a (meth)acrylic acid ester which is derived from a polyol compound and has two or more acryloyl groups in one molecule can be also used as the nonionic polymerizable compound. Examples of the polyol compound include condensates of glycohols, oligo ethers, oligo esters, and polyol compounds having 2 or more hydroxyl groups such as monosaccharide or disaccharide.

Further, (meth)acrylic acid esters with triethanolamine, diethanolamine, trishydroxy aminomethane, trishydroxy aminoethane, or the like are also preferable.

Moreover, specific examples of the water-soluble polymerizable compound represented by Formula (M-1) having a (meth)acrylic ester structure in a molecule thereof may include the cationic compounds shown below. However, the scope of the invention is not limited to these specific examples.

Structure 1

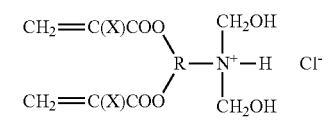

Structure 2

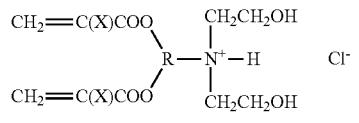

Structure 3

-continued

Structure 4

Structure 5

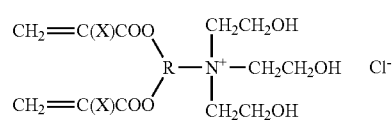

Structure 6

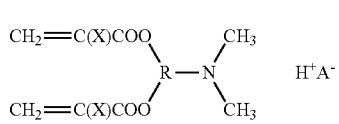

Structure 7

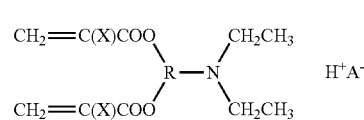

Structure 8

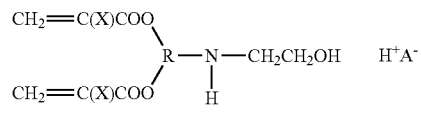

Structure 9

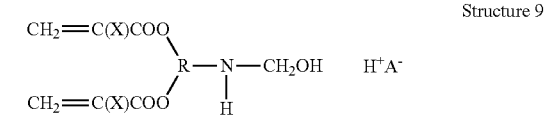

Structure 10

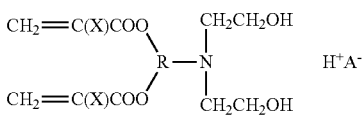

Structure 11

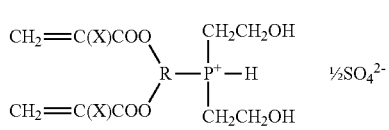

-continued

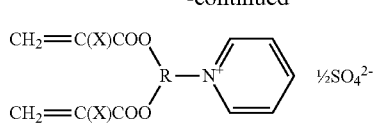
Structure 12

In the structure above, R represents a residue of a polyol compound. X represents H or CH₃, and A⁻ represents Cl⁻, HSO₄⁻, or Cl₃COO⁻. Examples of the polyol compound include glycerin, 1,2,4-butanetriol, 1,2,5-pentanetriol, 1,2,6-hexanetriol, trimethylolpropane, trimethylolmethane, trimethylolethane, pentaerythritol, bisphenol A, alicyclic bisphenol A, and condensates thereof. Further, examples of the polymerizable compound having a cationic group include those shown below (Cationic compounds 1 to 11).

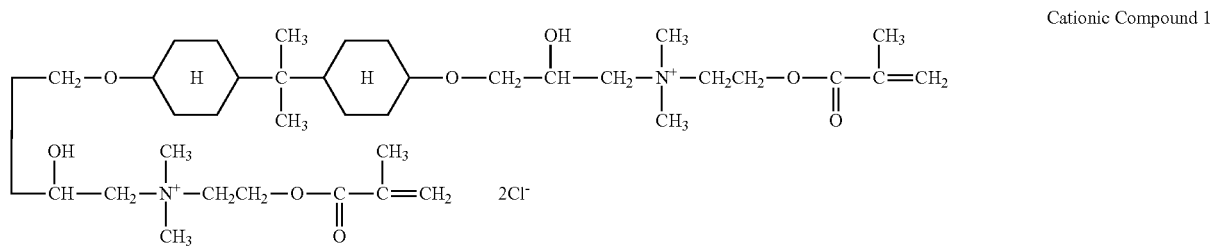
Cationic Compound 1

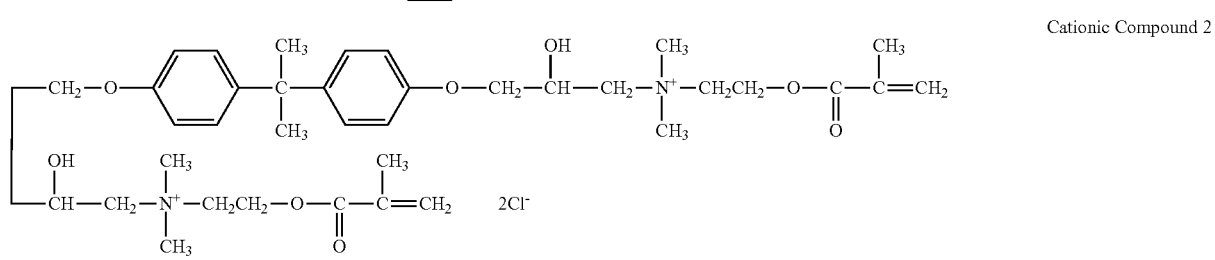
Cationic Compound 2

Cationic Compound 3

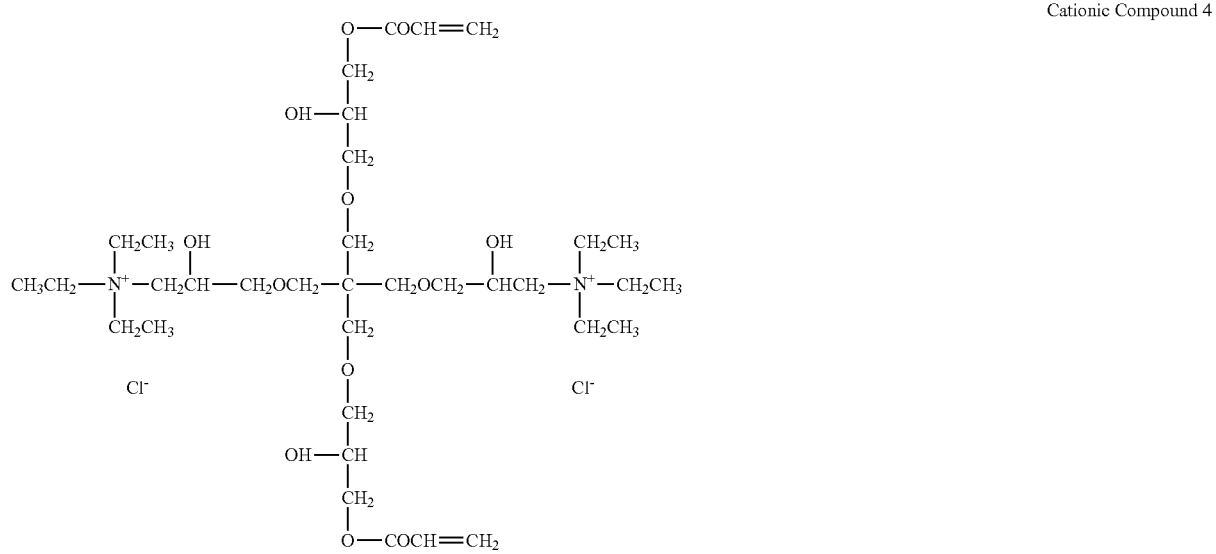
Cationic Compound 4

-continued

Cationic Compound 5

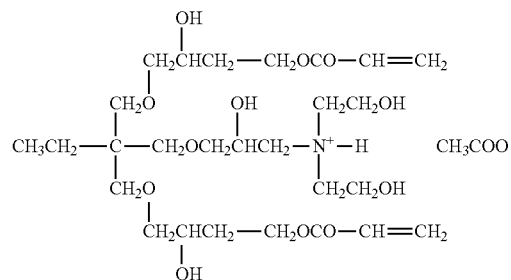

Cationic Compound 6

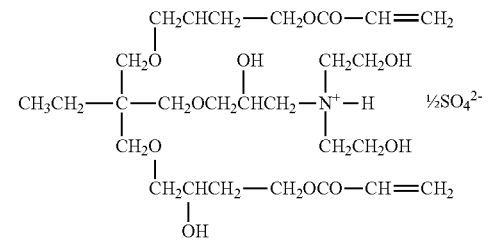

Cationic Compound 7

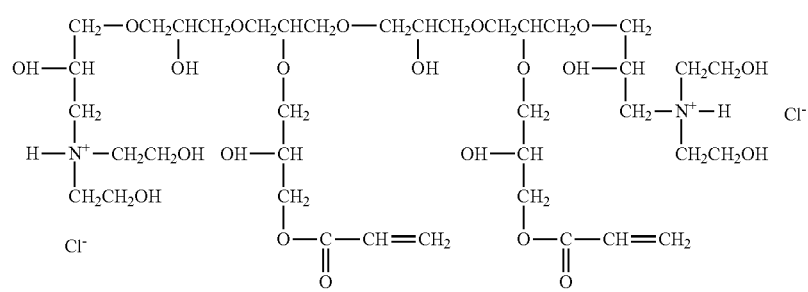

Cationic Compound 8

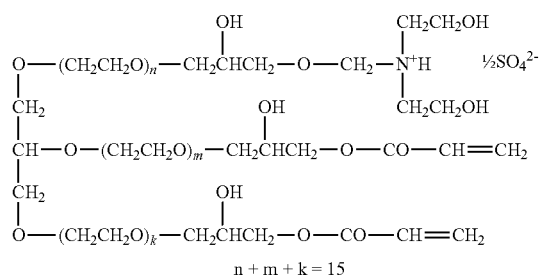

Cationic Compound 9

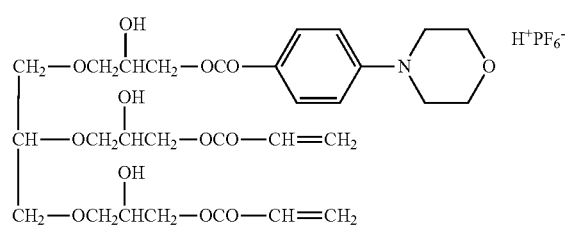

Cationic Compound 10

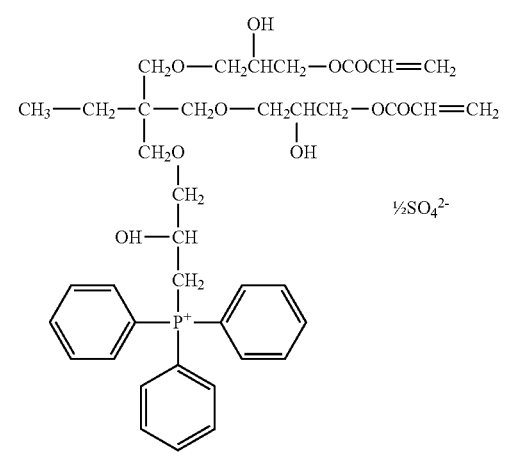

Cationic Compound 11

(Compound Having a (Meth)Acrylamide Structure in a Molecule Thereof)

The polymerizable compound having a (meth)acrylamide structure in a molecule thereof is not limited as long as the compound is soluble in water and is a polymerizable compound having a (meth)acrylamide structure in a molecule thereof.

The polymerizable compound having a (meth)acrylamide structure in a molecule thereof is preferably a compound represented by the following Formula (M-2). This is preferable because when the polymerizable compound has a structure represented by Formula (M-2), mutual solubility between the compound represented by Formula (1) which is described below and the polymerizable compound may be improved, and the curing sensitivity and the like can be improved.

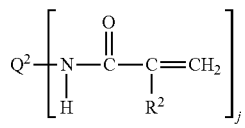

In Formula (M-2), $Q^2$ represents a j-valent linking group; $R^2$ represents a hydrogen atom or a methyl group; and j represents an integer of 1 or more.

The compound represented by Formula (M-2) is a compound in which an unsaturated monomer is bonded to a linking group $Q^2$ through an amide bond. $R^2$ represents a hydrogen atom or a methyl group, and preferably represents a hydrogen atom. The number represented by "j", which is the valency number of the linking group $Q^2$, is not limited, but preferably represents 2 or higher, more preferably represents from 2 to 6, and yet more preferably represents from 2 to 4.

The linking group $Q^2$ is not particularly limited, as long as the linking group $Q^2$ is a group capable of linking with a (meth)acryl amide structure. The specifics, including examples and preferred embodiments, of the linking group $Q^2$ is the same as those described in the linking group $Q^1$.

Specific examples of the water-soluble polymerizable compound represented by Formula (M-2) having a (meth)acrylamide structure in a molecule thereof include the water-soluble polymerizable compounds shown below.

Polymerizable Compound 1

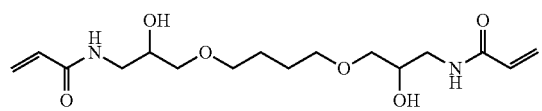

Polymerizable Compound 2

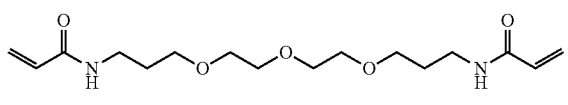

Polymerizable Compound 3

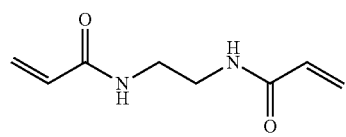

Polymerizable Compound 4

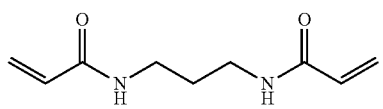

Polymerizable Compound 5

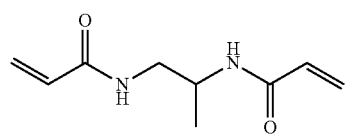

Polymerizable Compound 6

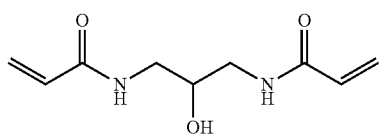

Polymerizable Compound 7

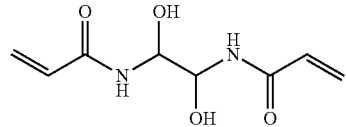

Polymerizable Compound 8

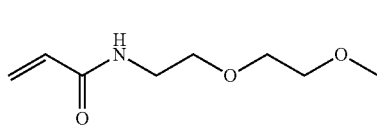

Polymerizable Compound 9

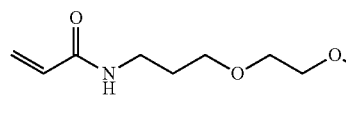

Polymerizable Compound 10

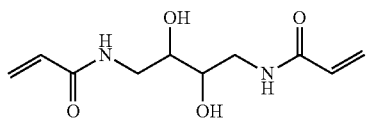

Polymerizable Compound 11

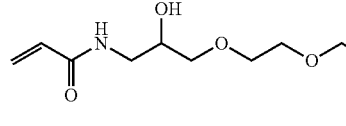

Polymerizable Compound 12

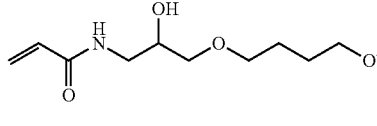

Polymerizable Compound 13

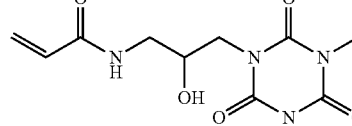

Polymerizable Compound 14

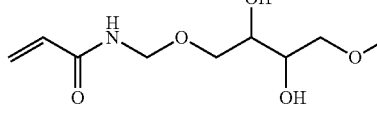

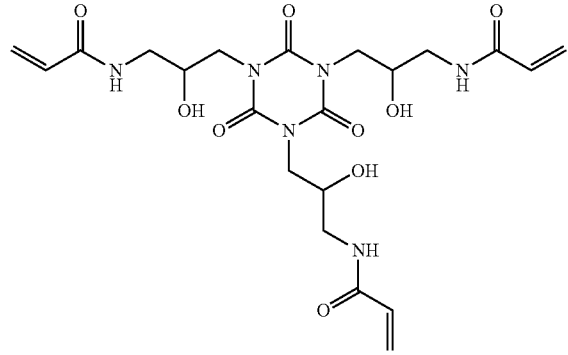

Polymerizable Compound 15
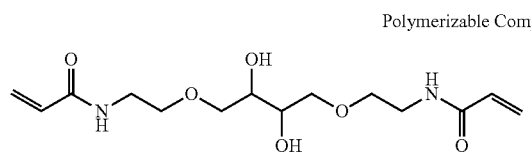
Polymerizable Compound 16
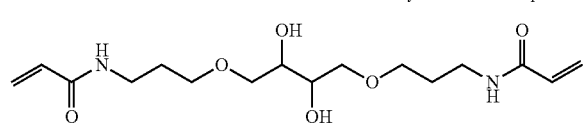
Polymerizable Compound 17
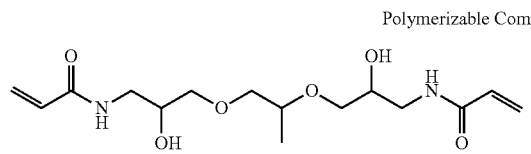
Polymerizable Compound 18
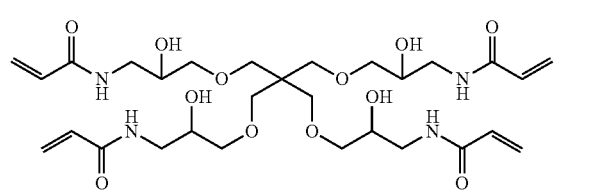
Polymerizable Compound 19
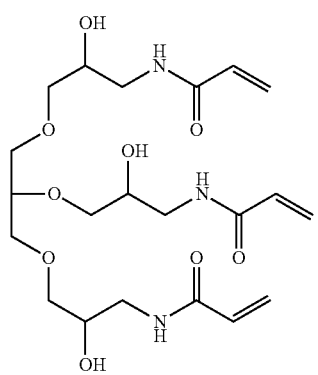
Polymerizable Compound 20
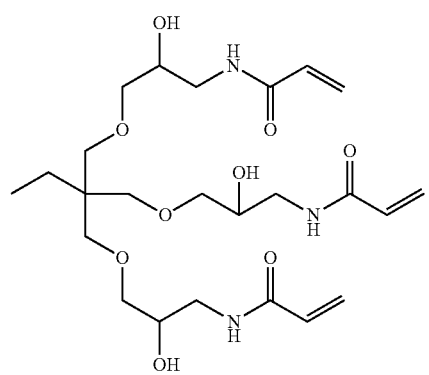
Polymerizable Compound 21
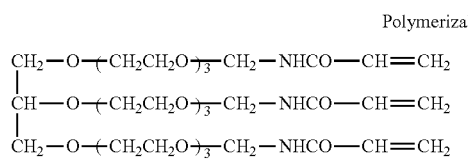
Polymerizable Compound 22
Polymerizable Compound 23
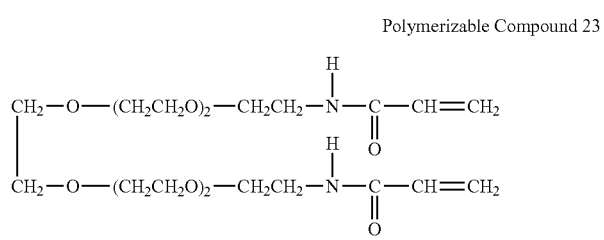
Polymerizable Compound 24
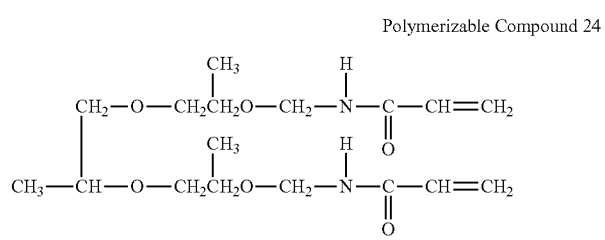
Polymerizable Compound 25
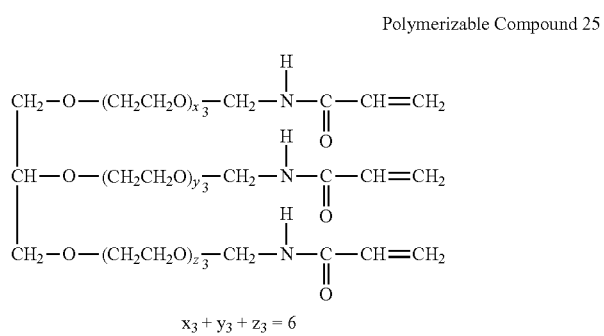
$x_3 + y_3 + z_3 = 6$
Polymerizable Compound 26
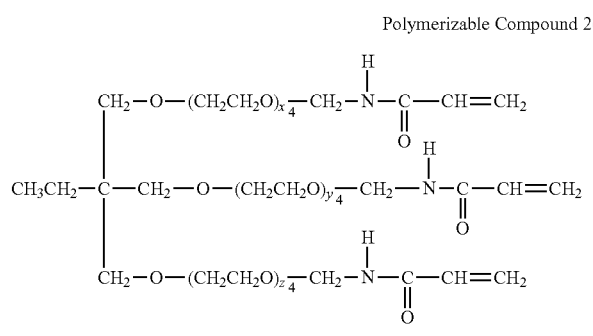
$x_4 + y_4 + z_4 = 9$ Polymerizable Compound 27
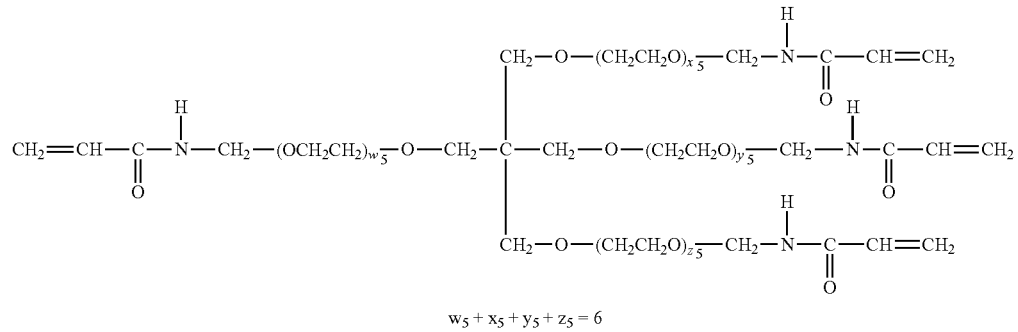
$w_5 + x_5 + y_5 + z_5 = 6$
Polymerizable Compound 28
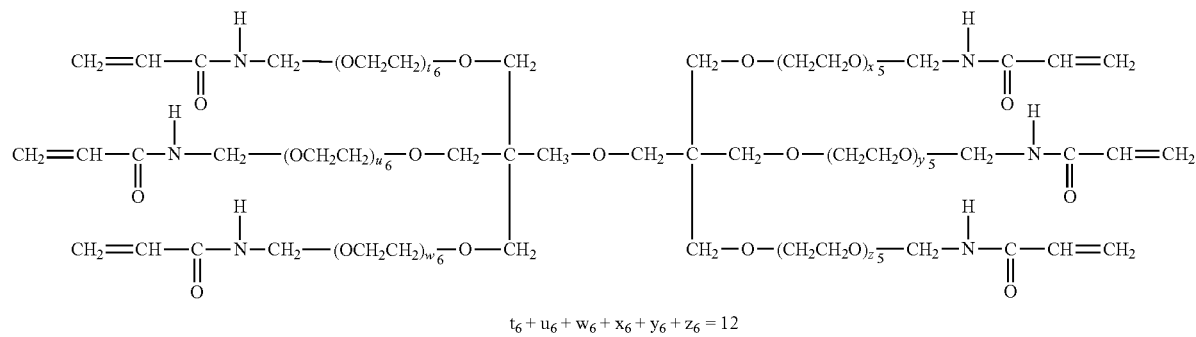
$t_6 + u_6 + w_6 + x_6 + y_6 + z_6 = 12$
Polymerizable Compound 29
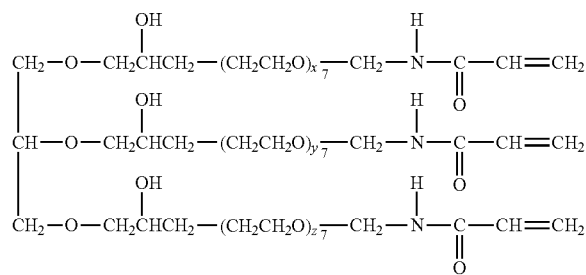
$x_7 + y_7 + z_7 = 3$
Polymerizable Compound 30
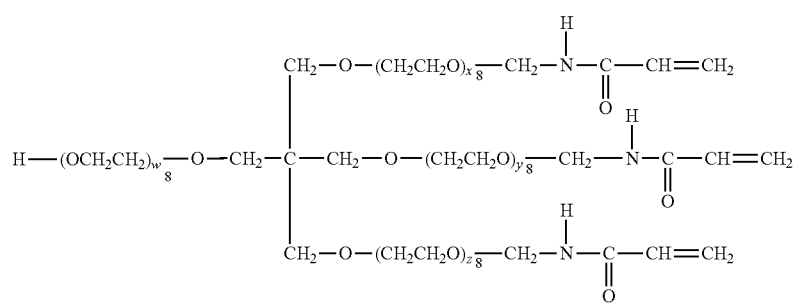
$w_8 + x_8 + y_8 + z_8 = 6$ Polymerizable Compound 31

$$\begin{array}{c} CH_2-O-(CH_2CH_2O)_{x_9}-CH_2\overset{OH}{C}HCH_2-O-CH_2-\overset{H}{N}-\underset{O}{C}-CH=CH_2 \\ CH_3CH_2-C-CH_2-O-(CH_2CH_2O)_{y_9}-CH_2\overset{OH}{C}HCH_2-O-CH_2-\overset{H}{N}-\underset{O}{C}-CH=CH_2 \\ CH_2-O-(CH_2CH_2O)_{z_9}-CH_2\overset{OH}{C}HCH_2-O-CH_2-\overset{H}{N}-\underset{O}{C}-CH=CH_2 \end{array}$$

$x_9 + y_9 + z_9 = 3$

Polymerizable Compound 32

Besides the polymerizable compounds described above, for example, a compound having a maleimide structure, a compound having a sulfamide structure, a compound having an N-vinylacetamide structure, or the like, which are represented by the compounds shown below, may also be used.

Polymerizable Compound 33

Polymerizable Compound 34

Polymerizable Compound 35

Polymerizable Compound 36

Polymerizable Compound 37

Polymerizable Compound 38

Polymerizable Compound 39

Polymerizable Compound 40

Polymerizable Compound 41

Polymerizable Compound 42

The water-soluble polymerizable compound may be used alone, or two or more kinds of thereof may be used in combination.

The content of the polymerizable compound in the ink composition is preferably from 3% by mass to 50% by mass, more preferable from 10% by mass to 30% by mass, and even more preferably from 15% by mass to 25% by mass, with respect to the total mass of the ink composition.

[Polymerization Initiator]

The black ink composition of the invention contains at least one polymerization initiator. The polymerization initiator is preferably at least one water-soluble polymerization initiator. Here, the term "water-soluble" in the polymerization initiator means that the polymerization initiator dissolves in distilled water at 25° C. at an amount of 0.5% by mass or more. The water-soluble polymerization initiator preferably dissolves in distilled water at 25° C. at an amount of 1% by mass or more, and more preferably dissolves at an amount of 3% by mass or more.

Examples of the water-soluble polymerization initiator include compounds represented by the following Formula (1) and compounds described in JP-A No. 2005-307198. Among these, the water-soluble polymerization initiator represented by the following Formula (1) is preferable from the viewpoints of adhesion and rub-off resistance.

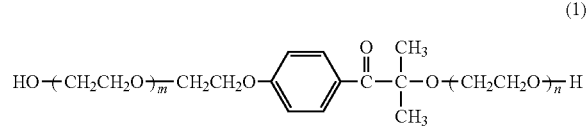

(1)

In Formula (1) above, in and n each independently represent an integer of 0 or more, and m+n represents an integer of from 0 to 3. With regard to in and n, it is preferable that in represents an integer of from 0 to 3 and n represents 0 or 1, and it is more preferable that in represents 0 or 1 and n represents 0.

Specific examples of the compound represented by Formula (1) above are shown below. However, the present invention is not limited to these specific examples.

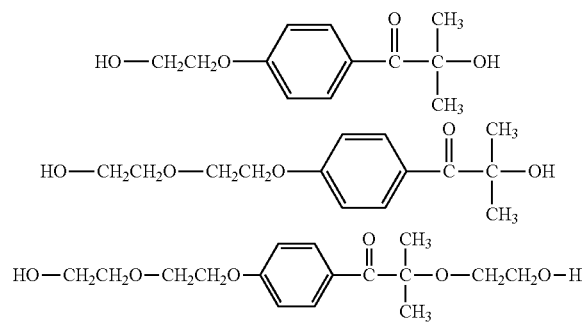

The compound represented by Formula (1) above may be a compound that is synthesized according to the method described in JP-A No. 2005-307198 and the like, or may be a commercially available compound. Examples of the commercially available compound represented by Formula (1) include IRGACURE 2959 (trade name) (m=0, and n=0).

The content of the polymerization initiator in the ink composition of the invention is preferably in a range of from 0.1% by mass to 30% by mass, more preferably in a range of from 0.5% by mass to 20% by mass, even more preferably in a range of from 1.0% by mass to 15% by mass, and most preferably in a range of from 1.0% by mass to 5.0% by mass.

[Water]

The black ink composition of the invention contains water. The content of water is not particularly limited, but is preferably from 10% by mass to 90% by mass, more preferably from 30% by mass to 80% by mass, and even more preferably from 50% by mass to 80% by 2 mass, with respect to the black ink composition.

[Water-Soluble Organic Solvent]

The black ink composition according to the invention may contain at least one water-soluble organic solvent. When a water-soluble organic solvent is contained, effects of moisturizing, preventing drying, or accelerating penetration can be obtained. For the purpose of preventing drying, a water-soluble organic solvent is used as an anti-drying agent that prevents clogging of ejection nozzles, which may be caused due to aggregation generated by attachment and drying of an ink at an ink ejection orifice. For the purpose of moisturizing or preventing drying, a water-soluble organic solvent which has a vapor pressure lower than that of water is preferably used. Further, a water-soluble organic solvent may be used as a penetration accelerator that enhances the permeability of an ink into paper.

Examples of the water-soluble organic solvent include alkane diol (polyhydric alcohols) such as glycerin, ethylene glycol, and propylene glycol; sugar alcohols; alkyl alcohols having 1 to 4 carbon atoms such as ethanol, methanol, butanol, propanol, and isopropanol; and glycol ethers such as ethylene glycol monomethyl ether, ethylene glycol monoethyl ether, ethylene glycol monobutyl ether, ethylene glycol monomethyl-ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxy butanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, and tripropylene glycol monomethyl ether. The water-soluble organic solvent may be used alone or two or more kinds thereof may be used in combination.

[Surfactant]

The black ink composition according tope invention preferably contains at least one surfactant. The surfactant may be used as a surface tension adjusting agent.

As the surface tension adjusting agent, a compound having a structure including both a hydrophilic moiety and a hydrophobic moiety in a molecule thereof, or the like, can be effectively used, and any of an anionic surfactant, a cationic surfactant, an amphoteric surfactant, a nonionic surfactant, or a betaine surfactant may be used.

In the invention, a nonionic surfactant is preferable, and in particular, an acetylene glycol surfactant is more preferable, from the viewpoint of suppression of droplet ejection interference of the ink composition.

Examples of the acetylene glycol surfactant include 2,4,7,9-tetramethyl-5-decyne-4,7-diol and alkylene oxide adducts of 2,4,7,9-tetramethyl-5-decyne-4,7-diol. It is preferable that the surfactant is at least one selected from the above acetylene glycol surfactants. Examples of commercially available products of these compounds include E series such as OLFINE E1010 (trade name, manufactured by Nissin Chemical Industry Co., Ltd.).

When the black ink composition contains a surfactant (a surface tension adjusting agent), the surfactant is preferably contained in the black ink composition in a range such that the surface tension of the ink composition can be adjusted to from 20 mN/m to 60 mN/m, more preferably 20 mN/m to 45 mN/m, and even more preferably 25 mN/m to 40 mN/m, from the viewpoint of favorably ejecting the ink composition by an inkjet Method.

Specifically, the content of the surfactant in the black ink composition is not particularly limited except that a range which imparts the above surface tension is preferable, and the content of the surfactant in the black ink composition is preferably 0.1% by mass or higher, more preferably from 0.1% by mass to 10% by mass, and even more preferably from 0.2% by mass to 3% by mass.

[Other Components]

In addition to the components described above, the black ink composition may further contain colloidal silica, resin particles, and various additives as other components, as necessary.

When the black ink composition contains colloidal silica, ejection stability is improved and also, deterioration of liquid repellency of the inkjet head member is suppressed. In particular, when silicone is used in at least a part of the inkjet head member, the effect is especially great.

As the colloidal silica, known colloidal silica which is described, for example, in JP-A No. 2002-206063 can be used.

The resin particles preferably have a function of fixing the ink composition, that is, an image, by increasing the viscosity of ink by aggregation or destabilization of dispersion when contacting a treatment liquid described below or a region on a recording medium to which the treatment liquid has been applied and dried. Such resin particles are preferably dispersed in water and at least one kind of the organic solvent.

Examples of resin particles that may be used in the invention include acrylic resin, vinyl acetate resin, styrene-butadiene resin, vinyl chloride resin, acrylic-styrene resin, butadiene resin, styrene resin, crosslinked acrylic resin, crosslinked styrene resin, benzoguanamine resin, phenol resin, silicone resin, epoxy resin, urethane resin, paraffin resin, and fluororesin and latexes thereof. Preferable examples include acrylic resin, acrylic-styrene resin, styrene resin, crosslinked acrylic resin, and crosslinked styrene resin.

The resin particles may also be used in a form of latex.

The weight average molecular weight of the resin particles is preferably from 10,000 to 200,000 and more preferably from 20,000 to 200,000.

The volume average particle diameter of the resin particles is preferably in the range of from 1 nm to 1 μm, more preferably in the range of from 1 nm to 200 nm, still more preferably in the range of from 1 nm to 100 nm, and particularly preferably in the range of from 1 nm to 50 nm.

The glass transition temperature Tg of the resin particles is preferably 30° C. or higher, more preferably 40° C. or higher, and still more preferably 50° C. or higher.

From the viewpoint of effectively obtaining the effects of the invention, the content of the resin particles with respect to the total amount of the ink composition is preferably 5% by mass or lower, more preferably 3% by mass or lower, and even more preferably 1% by mass or lower.

Examples of the various additives include known additives such as an ultraviolet absorbent, an anti-fading agent, an antifungal agent, a pH adjuster, an anticorrosive agent, an antioxidant, an emulsification stabilizer, an antiseptic, an defoaming agent, a viscosity adjuster, a dispersion stabilizer, and a chelating agent. The contents of these additives may be defined as appropriate depending on the intended use, but the content of each additive in the black ink composition may be from about 0.02% by mass to about 1.00% by mass.

Examples of the ultraviolet absorbent include a benzophenone ultraviolet absorbent, a benzotriazole ultraviolet absorbent, a salicylate ultraviolet absorbent, a cyanoacrylate ultraviolet absorbent, and a nickel complex salt ultraviolet absorbent.

Examples of the anti-fading agent that may be used include various kinds of organic and metal complex anti-fading agents. Examples of the organic anti-fading agent include hydroquinones, alkoxy phenols, dialkoxy phenols, phenols, anilines, amines, indans, chromans, alkoxy anilines, and heterocycles. Examples of the metal complex include a nickel complex and a zinc complex.

Examples of the antifungal agent include sodium dehydroacetate, sodium benzoate, sodium pyridinethione-1-oxide, p-hydroxybenzoic acid ethyl ester, 1,2-benzisothiazoline-3-on, sodium sorbate, and sodium pentachlorophenol.

As the pH adjuster, any pH adjuster can be suitably selected according to the purpose without particular limitation insofar as the pH can be adjusted to a desired value without adversely affecting the ink composition to be prepared. Examples thereof include alcohol amines (for example, diethanolamine, triethanolamine, and 2-amino-2-ethyl-1,3-propanediol), alkali metal hydroxides (for example, lithium hydroxide, sodium hydroxide, and potassium hydroxide), ammonium hydroxides (for example, ammonium hydroxide and quaternary ammonium hydroxide), phosphonium hydroxide, and alkaline metal carbonate.

Examples of the anticorrosive agent include acidic sulfite, sodium thiosulfate, ammonium thiodiglycolate, diisopropylammonium nitrite, pentaerythritol tetranitrate, and dicyclohexylammonium nitrite.

Examples of the antioxidant include a phenolic antioxidant (including a hindered phenolic antioxidant), an amine antioxidant, a sulfur antioxidant, and a phosphorous antioxidant.

Examples of the chelating agent include sodium ethylenediaminetetraacetate, sodium nitrilotriacetate, sodium hydroxyethyl ethylenediamine triacetate, sodium diethylenetriamine pentaacetate, and sodium uramil diacetate.

[Physical Properties of Black Ink Composition]

With regard to the absorbance at a wavelength of 350 nm and the absorbance at a wavelength of 600 nm which are measured after 5,000-fold dilution with water, an absorbance ratio of these absorbances (absorbance at a wavelength of 350 nm/absorbance at a wavelength of 600 nm) in the black ink composition is 1.9 or lower. A black ink composition having the absorbance ratio of the black ink composition is 1.9 or lower has excellent curing sensitivity with respect to actinic energy rays (in particular, ultraviolet rays).

Since carbon black has high absorbance in the ultraviolet region, conventionally, in an ultraviolet curable ink containing carbon black as a black pigment, the decomposition ratio of the polymerization initiator contained in the ink is low in some cases, and, as a result, there are cases in which the curing sensitivity of ink is not favorable.

In contrast, in the present invention, by setting the absorbance ratio of the absorbance at a wavelength of 350 nm to the absorbance at a wavelength of 600 nm at 1.9 or lower when the ink composition is diluted 5,000-fold with water, the curing sensitivity of the ink is improved.

The "absorbance ratio of 1.9 or lower" means that the absorbance of the ink composition in the ultraviolet region is relatively low and is near the absorbance in the visible region. In the light absorption of an ink composition containing carbon black, since the contribution ratio of the carbon black is high, the "absorbing ratio of 1.9 or lower" means that the absorbance of carbon black in the ultraviolet region is relatively low.

Accordingly, in the present invention, decomposition of the polymerization initiator contained in the ink is less likely to be prevented and, as a result, the ink composition of the invention has excellent curing sensitivity with respect to actinic energy rays (in particular, ultraviolet rays).

The absorbance ratio is more preferably 1.8 or lower, from the viewpoint of the curing sensitivity with respect to actinic energy rays (in particular, ultraviolet rays).

The lower limit of the absorbance ratio is not particularly limited, but is preferably 1.3 or higher, from the viewpoint of ink stability.

In the black ink composition, measurement of the absorbance is performed as follows. Namely, the black ink composition is diluted 5,000-fold with distilled water, and then the absorbance at a wavelength of 350 nm and the absorbance at a wavelength of 600 nm are measured using an ultraviolet-visible-infrared spectrophotometer V-570 (trade name, manufactured by JASCO Corporation).

In the black ink composition, the absorbance at a wavelength of 350 nm, which is measured after 5,000-fold dilution with water, is not particularly limited, but is preferably from 0.3 to 0.46, and more preferably from 0.35 to 0.44, from the viewpoint of adhesion. On the other hand, the absorbance at a wavelength of 600 nm, which is measured after 5,000-fold dilution with water, is not particularly limited, but is preferably from 0.2 to 0.3, and more preferably from 0.22 to 0.28, from the viewpoint of image density.

The absorbance ratio can be adjusted, for example, by adjusting the average primary particle diameter of the carbon black that forms a part of the resin-coated carbon black.

In general, the greater the average primary particle diameter of the carbon black becomes, the lower the absorbance at a wavelength of 350 nm becomes and, therefore, the absorbance ratio tends to be smaller. Therefore, by using a carbon black having a relatively high average primary particle diameter, the absorbance ratio can be adjusted to 1.9 or lower.

In the present invention, from the viewpoint of adjusting the absorbance ratio to 1.9 or lower, the average primary particle diameter of the carbon black that forms a part of the resin-coated carbon black is preferably 20 nm or more, and more preferably 25 nm or more.

In addition, a black ink composition having an absorbance ratio of 1.9 or lower has an excellent black hue with a reduced red tinge. From the viewpoint of the color tone of the ink, the absorbance ratio is preferably from 1.3 to 1.9, and more preferably from 1.3 to 1.8.

The volume average particle diameter of the resin-coated carbon black in a dispersed state in the black ink composition is preferably from 80 nm to 200 nm, more preferably from 80 nm to 180 nm, and even more preferably from 80 nm to 170 nm. When the volume average particle diameter is 200 nm or less, color reproducibility is satisfactory, and when ink droplets are ejected by an inkjet method, droplet ejection properties are excellent. When the volume average particle diameter is 80 nm or more, adhesion is satisfactory.

The volume average particle diameter of the resin-coated carbon black in the dispersed state indicates the volume average particle diameter of the resin-coated carbon black that has been made into ink. However, the preferable volume average particle diameter range and the effects achieved thereby described above also apply to the volume average particle diameter of the dispersed resin-coated carbon black in a concentrated ink dispersion from which a final ink is prepared.

Further, the volume average particle diameter of the resin-coated carbon black in a dispersed state in the black ink composition is measured using a particle size distribution measuring apparatus NANOTRAC UPA-EX150 (trade name, manufactured by Nikkiso Co., Ltd.) by a dynamic light scattering method.

The surface tension (25° C.) of the black ink composition is preferably from 20 mN/m to 60 mN/m. The surface tension is more preferably from 20 mN/m to 45 mN/m and still more preferably from 25 mN/m to 40 mN/m.

The surface tension is determined by measuring the ink composition at 25° C. using an Automatic Surface Tensiometer CBVP-Z (trade name, manufactured by Kyowa Interface Science Co., LTD.).

The viscosity at 25° C. of the black ink composition is preferably from 1.2 mPa·s to 15.0 mPa·s, more preferably from 2 mPa·s but less than 13 mPa·s, and still more preferably from 2.5 mPa·s but less than 10 mPa·s.

The viscosity is determined by measuring the ink composition at 25° using a VISCOMETER TV-22 (trade name, manufactured by TOKI SANGYO CO. LTD).

[Production Method]

The black ink composition can be produced by a conventional method. For example, the black ink composition can be produced by mixing the resin-coated carbon black, at least one water-soluble polymerizable compound, at least one polymerization initiator, and water, and as necessary, a water-soluble organic solvent and a surfactant. The mixing method is not particularly limited, and a commonly-used mixing method may be selected as appropriate and applied.

<Ink Set>

The ink set for inkjet recording of the invention includes at least one black ink composition as described above and at least one treatment liquid including an aggregating agent that is capable of forming an aggregate when contacting the black ink composition.

By forming an image using the treatment liquid together with the above black ink composition in accordance with the image forming method described below, an image with superior adhesion, rub-off resistance, and film strength is formed. Further, inkjet recording can be performed at a higher speed, and even when high-speed recording is performed, an image having high density, high resolution, and excellent imaging characteristics (for example, reproducibility of fine lines or fine portions) is obtained.

[Treatment Liquid]

The treatment liquid contains at least one kind of aggregating agent capable of forming an aggregate when contacting the black ink composition, and further contains other ingredients as necessary.

The aggregating agent can aggregate (fix) ingredients in the ink composition when contacting the ink composition on a recording medium and, for example, functions as a fixing agent. For example, in a state in which the aggregating agent is present on a recording medium (preferably a coated paper) as a result of application of the treatment liquid to the recording medium, droplets of the ink composition are applied and contact the aggregating agent, the ingredients in the ink composition aggregate, and the ingredients in the ink composition can be fixed on the recording medium.

Examples of the aggregating agent that fixes the ingredients in the ink composition include an acidic compound, a polyvalent metal salt, and a cationic polymer. Among these, the aggregating agent is preferably an acidic compound from the viewpoint of aggregation of ingredients in the ink composition. The aggregating agent may be used alone or two or more kinds thereof maybe used in combination.

[Acidic Compound]

Preferable examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives of these compounds.

Among the above, an acidic compound having high water solubility is preferable. From the viewpoint of reacting with ingredients in the ink composition and fixing the entire ink, a trivalent or lower valent acidic compound is preferable, and a divalent or a trivalent acidic compound is particularly preferable.

The acidic compound may be used singly or in combination of two or more thereof.

When the treatment liquid contains the acidic compound, the pH (25° C.) of the treatment liquid is preferably from 0.1 to 6.8, more preferably from 0.5 to 6.0, and still more preferably from 0.8 to 5.0.

The content of the acidic compound is preferably 40% by mass or less, more preferably from 15 to 40% by mass, and still more preferably from 15 to 35% by mass, with respect to the total mass of the treatment liquid. By adjusting the content of the acidic compound to 40% by mass or less, ingredients in the ink composition can be more efficiently fixed.

(Polyvalent Metal Salt)

Examples of the polyvalent metal salt include a salt of alkali earth metal which belongs to Group 2 of the periodic table (for example, magnesium and calcium), a salt of transition metal which belongs to Group 3 of the periodic table (for example, lanthanum), a salt of a metal from Group 13 of the periodic table (for example, aluminum), and a salt of lanthanides (for example, neodymium). Preferable examples of the salt of the above metals include carboxylic acid salt (such as formate, acetate, or benzoate), nitrate, chloride, and thiocyanate. Among them, a calcium salt or magnesium salt of carboxylic acid (formic acid, acetic acid, and benzoic acid), a calcium salt or magnesium salt of nitric acid, calcium chloride, magnesium chloride, and a calcium salt or magnesium salt of thiocyanic acid are preferable.

The polyvalent metal salt may be used singly or in mixture of two or more thereof.

The content of the polyvalent metal salt is preferably 15% by mass or more with respect to the total mass of the treatment liquid. When the content of the polyvalent metal salt is 15% by mass or more, ingredients in the ink composition can be more effectively fixed. The content of the polyvalent metal salt is preferably from 15% by mass to 35% by mass with respect to the total mass of the treatment liquid.

(Cationic Polymer)

Examples of the cationic polymer include at least one kind of cationic polymer selected from a poly(vinylpyridine) salt, polyalkylaminoethyl acrylate, polyalkylaminoethyl methacrylate, poly(vinylimidazole), polyethyleneimine, polybiguanide, and polyguanide.

The cationic polymer may be used singly or in combination of two or more thereof.

Among the above cationic polymers, polyguanide (preferably poly(hexamethylene guanidine)acetate, polymonoguanide, and polymeric biguanide), polyethyleneimine, or poly(vinylpyridine) is preferable since it is advantageous in the aggregation rate.

The weight average molecular weight of the cationic polymer is preferably smaller in terms of the viscosity of the treatment liquid. When the treatment liquid is applied to a recording medium by an inkjet method, the weight average molecular weight is preferably in the range of from 500 to 500,000, more preferably in the range of from 700 to 200,000, and still more preferably in the range of from 1,000 to 100,000. The weight average molecular weight of 500 or more is advantageous in terms of the aggregation rate and the weight average molecular weight of 500,000 or less is advantageous in terms of ejection reliability. However, the same does not necessarily apply to the case where the treatment liquid is applied to a recording medium by methods other than the inkjet method.

When the treatment liquid contains the cationic polymer, the pH (25° C.) of the treatment liquid is preferably from 1.0 to 10.0, more preferably from 2.0 to 9.0, and still more preferably from 3.0 to 7.0.

The content of the cationic polymer is preferably from 1% by mass to 35% by mass and more preferably from 5% by mass to 25% by mass, with respect to the total mass of the treatment liquid.

The treatment liquid preferably contains at least one water-soluble organic solvent, in addition to the aggregating agent. The specifics, including examples and preferred embodiments, of the water-soluble organic solvent is the same as those described in the ink composition.

The treatment liquid may further contain other additives as additional components as long as the effects of the present invention are not impaired. Examples of other additives include known additives such as an anti-drying agent (wetting agent), an anti-fading agent, an emulsification stabilizer, a penetration accelerating agent, an ultraviolet absorbeng, a preservative, an antifungal agent, a pH adjuster, a surface tension adjuster, a defoaming agent, a viscosity adjuster, a dispersant, a dispersion stabilizer, an anticorrosive agent, and a chelating agent.

<Image Forming Method>

Examples of an image forming method using the ink set described above include an image forming method that includes: a treatment liquid application process of applying the treatment liquid in the above ink set onto a recording medium; an ink application process of applying the black ink composition in the above ink set onto the recording medium by an inkjet method; and a curing process of irradiating the black ink composition that has been applied onto the recording medium with an actinic energy ray; and further, as necessary, other processes.

Ingredients contained in the ink composition are imparted with an aggregated state by the aggregating agent contained in the treatment liquid, and an actinic energy ray is irradiated thereto, thereby polymerizing and curing the polymerizable compound, and thus an image having more excellent adhesion to the recording medium and more excellent rub-off resistance can be formed. In addition, the image obtained by curing has further improved film strength.

[Treatment Liquid Application Process]

In the treatment liquid application process, a treatment liquid including an aggregating agent that is capable of forming an aggregate when contacting the ink composition is applied onto the recording medium, and the applied treatment liquid contacts the ink composition to form an image. In this case, dispersed particles in the ink composition such as the pigment, the polymer particles, and the like, aggregate, whereby the image is fixed onto the recording medium. The details and preferred embodiments of the respective components in the treatment liquid are described above.

The treatment liquid may be applied by a known method such as a coating method, an inkjet method, or an immersion method. Examples of the coating method include known coating methods using a bar coater, an extrusion die coater, an air doctor coater, a blade coater, a rod coater, a knife coater, a squeeze coater, and a reverse roll coater. Details of the inkjet method are the same as those described below.

The treatment liquid application process may be performed before or after the ink application process using the ink composition. In the invention, an embodiment in which the ink application process is performed after the treatment liquid is applied in the treatment liquid application process is preferable. Specifically, it is preferable that the treatment liquid that is capable of aggregating the pigment in the ink composition is applied in advance on a recording medium prior to applying (ejecting) the ink composition by an inkjet method, and the ink composition is ejected so as to contacts the treatment liquid that has been applied on the recording medium, whereby an image is formed. As a result, inkjet recording can be performed at a higher speed, and an image having high density and resolution can be obtained even when recording is performed at a high speed.

The amount of the treatment liquid to be applied is not particularly limited as long as the amount is capable of aggregating the ink composition. The amount of the treatment liquid to be applied is preferably such that the amount of the aggregating agent applied is adjusted to 0.1 g/m$^2$ or more. The amount of the treatment liquid to be applied is more preferably such that the amount of the aggregating agent applied is adjusted to from 0.1 g/m$^2$ to 1.0 g/m$^2$ and more preferably from 0.2 g/m$^2$ to 0.8 g/m$^2$. When the amount of the aggregating agent applied is 0.1 g/m$^2$ or more, the aggregation reaction proceeds satisfactory. When the amount of the aggregating agent applied is 1.0 g/m$^2$ or less, the glossiness is not too high, which is preferable.

It is preferable that the ink application process is performed after the treatment liquid application process, and further, that a heat-drying process of drying the treatment liquid on a recording medium by heating is performed at a time after the application of the treatment liquid on a recording medium and before the application of the ink composition, in the image forming method. By drying the treatment liquid by heating prior to the ink application process, the ink coloring properties such as suppression of bleed are improved, and a visible image having superior color density and hue can be recorded.

The drying by heating may be performed by a known heating means such as a heater or the like, or an air-blowing means using air-blowing by a drier or the like, or a means having a combination thereof. Examples of heating methods include a method of supplying heat from the side of the recording medium opposite to the surface on which the treatment liquid has been applied using a heater or the like, a method of blowing warm air or hot air to the recording medium on which the treatment liquid has been applied, and a heating method using an infrared heater, and a combination of two or more of the above methods.

[Ink Application Process]

In the ink application process, the black ink composition of the invention which is described above is applied onto a recording medium by an inkjet method. In this process, the ink composition can be selectively applied onto the recording medium, and a desired image can be formed.

The inkjet method is not particularly limited and may be any known system; for example, a charge control system of ejecting ink by an electrostatic attraction force; a drop on demand system of utilizing a pressure of vibration of a piezo element (pressure pulse system); an acoustic inkjet system of converting electric signals into acoustic beams, irradiating them to an ink, and ejecting the ink by utilizing radiation pressure; or a thermal inkjet system of heating ink to form bubbles and utilizing the resultant pressure (BUBBLEJET (registered trade mark)). Examples of the inkjet method include a system of ejecting a large number of small-volume ink droplets of a low concentration ink called "photo-ink", a system of improving image quality using plural kinds of inks of substantially identical hue and of different densities, and a system of using a colorless transparent ink.

In the image formation by an inkjet method, the ink composition is ejected onto a recording medium by applying energy, and a colored image is formed. As an inkjet recording method preferable to the invention, the method described in paragraphs 0093 to 0105 of JP-A No. 2003-306623 can be applied.

The inkjet head used in the inkjet method may either be an on-demand system head or a continuous system head. Specific examples of the ejecting systems include an electric-mechanical transduction system (for example, a single-cavity system, a double-cavity system, a bender system, a piston system, a share-mode system or a shared-wall system), an electric-thermal transduction system (for example, a thermal inkjet system or a BUBBLEJET (registered trade mark) system), an electrostatic suction system (for example, an electric field control system or slit jet system), and an electric discharge system (for example, a spark-jet system). Any of these ejecting systems may be used.

Ink nozzles or the like used for recording by the inkjet method are not particularly limited, and may be selected appropriately according to the purpose.

Examples of the inkjet method include (i) a shuttle mode in which recording is performed while a short serial head having a small length is moved in the width direction of a recording medium in a scanning manner, and (ii) a line mode in which a line head having recording devices that are aligned correspondingly to the entire length of one side of a recording medium is used. In the line mode, image recording can be performed over the whole of one surface of a recording medium by moving the recording medium in a direction orthogonal to the disposal direction along which the recording devices are aligned, and a conveyance system such as a carriage that moves the short head in a scanning manner is not required. Since complicated scan-movement control of the movement of the carriage and the recording medium is not required and only the recording medium is moved, a faster recording speed can be achieved compared to the shuttle mode. The image forming method according to the invention may be applied to both of these modes, but when the inkjet recording method according to the invention is applied to a line mode, in which dummy jetting is not generally conducted, the effects in improvement of ejection accuracy and the abrasion resistance of an image are significant.

The amount of the ink droplets ejected from an inkjet head is preferably from 0.5 pl (picoliter) to 6 pl, more preferably from 1 pl to 5 pl, and further more preferably from 2 pl to 4 pl, from the viewpoints of obtaining a high-precision image.

[Heat-Drying Process]

The image forming method preferably includes, after the ink application process, a heat-drying process in which at least a portion of the solvent in the ink composition is removed by heating the ink image that has been formed by the application of the ink composition. By performing the heat-drying treatment, an image having more excellent adhesion and rub-off resistance can be formed by the subsequent curing process.

The heating method is not particularly limited, but preferable examples thereof include drying methods without direct contact such as a heating method using a heating member (such as a nichrome wire heater), a method of supplying warm air or hot air, or a heating method using a halogen lamp or an infrared ray lamp.

[Curing Process]

In the image forming method, a curing process of irradiating the ink composition that has been applied onto a recording medium with an actinic energy ray is performed. Examples of the actinic energy ray to be used in this process include α rays, γ rays, electron beams, X rays, ultraviolet rays, visible light, and infrared ray.

The curing process of irradiating with an actinic energy ray is a process of irradiating the ink image formed by the application of the ink composition with, for example, an ultraviolet ray from an ultraviolet ray irradiation lamp. Thereby, a monomer component (the water-soluble polymerizable compound) in the image can surely be polymerized and cured. In this process, the ultraviolet ray irradiation lamp is arranged to face the recording surface of the recording medium, and the entire recording surface is irradiated, whereby curing of the entire image can be performed. The light source for irradiation of actinic energy ray is not limited to the ultraviolet ray irradiation lamp, and a halogen lamp, a high-pressure mercury lamp, a laser, an LED (light emitting diode), an electron beam irradiation equipment, or the like can also be employed.

The curing process of irradiating with an actinic energy ray may be performed before or after the heating and drying process as long as the curing process is performed after the ink application process and the treatment liquid application process. The curing process may be performed before and after the heating and drying process.

A condition of irradiation of the actinic energy ray is not particularly limited as long as the polymerizable compound is capable of being polymerized and cured. For example, the wavelength of the active energy ray is preferably from 200 to 600 nm, more preferably from 300 to 450 nm, and still more preferably from 350 to 420 nm.

The output of active energy ray is preferably 5000 mJ/cm$^2$ or less, more preferably from 10 to 4000 mJ/cm$^2$, and still more preferably from 20 to 3000 mJ/cm$^2$.

(Recording Medium)

The image forming method is a method of recording an image on a recording medium.

The recording medium for use is not particularly limited, and may be general printing paper containing cellulose as the major component such as high-quality paper, coat paper or art paper for use in general offset printing and the like. When image recording is performed on the general printing paper containing cellulose as the major component by a general inkjet method with an aqueous ink, absorption and drying of the ink is relatively slow, and colorant migration likely occurs after ejecting ink droplets, whereby image quality is apt to degrade. However, when image recording is conducted by the image forming method according to the invention, a high-grade image recording having excellent color density and hue can be achieved while suppressing the colorant migration.

The recording medium may be a commercially-available product, and examples thereof include high-quality papers (A) such as PRINCE WOOD FREE (trade name) manufactured by Oji Paper Co., Ltd., SHIRAOI (trade name) manufactured by Nippon Paper Industries Co., Ltd., and New NPI jo-shitsu (New NPI high-quality; trade name) manufactured by Nippon Paper Industries Co., Ltd.; ultra light-weight coated papers such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (trade name) manufactured by Nippon Paper Industries Co., Ltd.; and art papers (A1) such as KINFUJI (2/SIDE GOLDEN CASK GLOSS) (trade name) manufactured by Oji Paper Co., Ltd. and TOKUBISHI ART (trade name) and TOKUBISHI ART DOUBLE-SIDED N (trade name) both manufactured by Mitsubishi Paper Mills Ltd. As the recording medium, various inkjet-recording papers exclusively for photos may be used.

Among the above, from the viewpoint of obtaining a high-quality image having better color density and hue than conventionally and having an effect of highly suppressing colorant migration, a water absorption coefficient Ka of the recording medium is preferably from 0.05 to 0.5 mL/m$^2$·ms$^{1/2}$, more preferably from 0.1 to 0.4 mL/m$^2$·ms$^{1/2}$, and still more preferably from 0.2 to 0.3 mL/m$^2$·ms$^{1/2}$.

The water absorption coefficient Ka has the same meaning as that described in JAPAN TAPPI pulp and paper test method No. 51:2000 (published by Japan Technical Association of the Pulp and Paper Industry). Specifically, the water absorption coefficient Ka is determined by calculating the difference in the amount of transferred water between at a contact time of 100 ms and at a contact time of 900 ms measured with an automatic scanning liquid absorptometer KM500Win (trade name, manufactured by Kumagai Riki Kogyo Co., Ltd.).

Among the recording media, a so-called coated paper for use in general offset printing is preferable. The coated paper is obtained by applying a coating material to a surface of general non-surface-treated high-quality paper containing cellulose as the major component, neutralized paper or the like to form a coating layer thereon. In usual image forming by an aqueous inkjet method, the coated paper is likely to cause a problem in quality such as image glossiness, rub-off resistance, or the like. However, when image recording is conducted by the image forming method according to the invention, an image having favorable glossiness and rub-off resistance can be obtained while suppressing uneven glossiness. In particular, coated paper having a base paper and a coating layer containing kaolin and/or calcium bicarbonate is preferably used. More specifically, art paper, coat paper, lightweight coat paper, and ultra light-weight coated paper are more preferable.

EXAMPLES

Hereinafter, the invention is further specifically described with reference to Examples but is not limited to the Examples. Unless otherwise specified, "part(s)" and "%" are based on mass.

<Synthesis of Water-Soluble Resin Dispersant P-1>

Methacrylic acid (172 parts), benzyl methacrylate (828 parts), and isopropanol (375 parts) were mixed to prepare a monomer supply composition.

2,2-azobis(2-methylbutyronitrile) (22.05 parts) and isopropanol (187.5 parts) were mixed to prepare an initiator supply composition.

Isopropanol (187.5 parts) was heated to 80° C. in a nitrogen atmosphere, and a mixture of the monomer supply composition and the initiator supply composition was added dropwise thereto over 2 hours. After the dropwise addition was completed, the reaction liquid was further kept for 4 hours at 80° C., and then cooled to 25° C. After cooling, the solvent was distilled off under reduced pressure, to obtain water-soluble resin dispersant P-1 (water-soluble resin).

The weight average molecular weight of the water-soluble resin as measured by GPC was about 50,000. Further, the acid value was determined according to the method described in JIS Standards (JIS K 0070: 1992) and was found to be 112 mgKOH/g.

<Preparation of Carbon Black Dispersion K1>

With regard to water-soluble resin dispersant P-1 (150 parts) obtained as described above, an amount equivalent to 0.8 of the amount of the methacrylic acid in the water-soluble resin dispersant was neutralized using an aqueous solution of potassium hydroxide. Then, distilled water was further added thereto such that the concentration of the water-soluble resin dispersant was 25% by mass, thereby preparing an aqueous solution of the water-soluble resin dispersant.

The aqueous solution of the water-soluble resin dispersant (97.2 parts), carbon black pigment MA7 (trade name, manufactured by Mitsubishi Chemical Corporation; average primary particle diameter of 24 nm, BET specific surface area of 115 $m^2/g$) (48.6 parts), water (78.2 parts), and dipropylene glycol (100 parts) were mixed, and the mixture was dispersed with a bead mill using zirconia beads having a diameter of 0.1 mm. Dispersion was continued until a desired volume average particle diameter was obtained. In this way, resin coated carbon black dispersion N1 (uncrosslinked dispersion) having a pigment concentration of 15% by mass was obtained.

100 g of ion exchanged water and 1.1 parts of DENACOL EX-321 (trade name, manufactured by Nagase ChemteX Corporation; epoxy equivalent weight of 140) were added to the above dispersion N1 (150 parts), and the mixture was reacted at 60° C. for six and a half hours, and then the mixture was cooled to 25° C., whereby the resin which covered the carbon black was crosslinked. The obtained crosslinked dispersion was purified using an ultrafiltration membrane (with a molecular weight cutoff of 50,000; trade name: Q0500076E ULTRAFILTER, manufactured by ADVANTEC MFS, INC.), and then the pigment concentration was adjusted to 15% by mass, thereby obtaining carbon black dispersion K1, which is a dispersion (crosslinked dispersion) of resin-coated carbon black.

In this process, the usage amount of the crosslinking agent with respect to 100 parts of the water-soluble resin dispersant was 9.78 parts.

The crosslinking ratio was calculated as follows.

1.1 parts of DENACOL EX-321 (trade name) described above, which served as the crosslinking agent, were allowed to react with respect to 11.25 parts of the water-soluble resin dispersant. Thus, the equivalent number of moles of the crosslinking agent to be reacted with 1 mol of the water-soluble resin dispersant is calculated as follows.

$$(1.1/140)/(11.25/\text{Weight average molecular weight of the water-soluble resin dispersant (50000)}) = 34.9$$

Since DENACOL EX-321 (trade name) reacts with a carboxyl group, the number of moles of a reactive group that can react with the crosslinking agent in 1 mol of the water-soluble resin dispersant is the total number of moles of the methacrylic acid (molecular weight of 86) that 1 mol of the water-soluble resin dispersant possesses.

$$50000 \times 0.172/86 = 100 \text{ mol}$$

Accordingly, the crosslinking ratio is determined as follows.

Crosslinking ratio (mol %)=34.9×100/100= 34.9 mol %

<Preparation of Carbon Black Dispersion K2>

Carbon black dispersion K2 was obtained in the same manner as in the preparation of carbon black dispersion K1, except that the carbon black pigment was changed to MA 100 (trade name, manufactured by Mitsubishi Chemical Corporation; average primary particle diameter of 24 nm, BET specific surface area of 110 $m^2/g$).

<Preparation of Carbon Black Dispersion K3>

Carbon black dispersion K3 was obtained in the same manner as in the preparation of carbon black dispersion K1, except that the carbon black pigment was changed to PRINTEX 200 (trade name, manufactured by Evonik-Degussa GmbH; average primary particle diameter of 56 nm, BET specific surface area of 45 $m^2/g$).

<Preparation of Carbon Black Dispersion K4>

Carbon black dispersion K4 was obtained in the same manner as in the preparation of carbon black dispersion K1, except that the carbon black pigment was changed to PRINTEX 300 (trade name, manufactured by Evonik-Degussa GmbH; average primary particle diameter of 27 nm, BET specific surface area of 80 $m^2/g$).

<Preparation of Carbon Black Dispersion K5>

Carbon black dispersion K5 was obtained in the same manner as in the preparation of carbon black dispersion K1, except that the carbon black pigment was changed to #10 (trade name, manufactured by Mitsubishi Chemical Corporation; average primary particle diameter of 75 nm, BET specific surface area of 30 $m^2/g$).

<Preparation of Carbon Black Dispersion K6>

Carbon black dispersion K6 was obtained in the same manner as in the preparation of carbon black dispersion K1, except that the carbon black pigment was changed to COLOR BLACK S170 (trade name, manufactured by Evonik-Degussa GmbH; average primary particle diameter of 17 nm, BET specific surface area of 200 $m^2/g$).

<Preparation of Carbon Black Dispersion K7>

Carbon black dispersion K7 was obtained in the same manner as in the preparation of carbon black dispersion K1, except that the carbon black pigment was changed to #2300 (trade name, manufactured by Mitsubishi Chemical Corporation; average primary particle diameter of 15 nm, BET specific surface area of 320 $m^2/g$).

<Preparation of Carbon Black Dispersion K8>

Carbon black dispersion K8 was obtained in the same manner as in the preparation of carbon black dispersion K1, except that the carbon black pigment was changed to MCF 88 (trade name, manufactured by Mitsubishi Chemical Corporation; average primary particle diameter of 18 nm, BET specific surface area of 180 $m^2/g$).

<Preparation of Carbon Black Dispersion K9>

Carbon black dispersion K9 was obtained in the same manner as in the preparation of carbon black dispersion K1, except that the carbon black pigment was changed to SPECIAL BLACK 550 (trade name, manufactured by Evonik-Degussa GmbH; average primary particle diameter of 25 nm, BET specific surface area of 100 $m^2/g$).

<Preparation of Carbon Black Dispersion K10>

Carbon black dispersion K10 was obtained in the same manner as in the preparation of the carbon black dispersion K1, except that the carbon black pigment was changed to #45L (trade name, manufactured by Mitsubishi Chemical Corporation; average primary particle diameter of 24 nm, BET specific surface area of 125 $m^2/g$).

<Synthesis of Polymerizable Compound 2>

To a 1 L three-necked flask equipped with a stirrer, 40.0 g (182 mmol) of 4,7,10-trioxa-1,13-tridecanediamine, 37.8 g (450 mmol) of sodium hydrogencarbonate, 100 g of water, and 300 g of tetrahydrofuran were added. Then, while the flask was cooled in an ice bath, 35.2 g (389 mmol) of acrylic acid chloride were added thereto dropwise over 20 minutes.

After the dropwise addition was completed, the reaction liquid was stirred at room temperature for 5 hours. Then, from the resulting reaction mixture, tetrahydrofuran was distilled off under reduced pressure. Subsequently, the aqueous layer was extracted 4 times with 200 mL of ethyl acetate. The obtained organic layers were dried over magnesium sulfate and then filtrated. Thereafter, the solvent was distilled off under reduced pressure, whereby 35.0 g (107 mmol, yield: 59%) of solid matter of the desired polymerizable compound 2 were obtained.

Polymerizable Compound 2

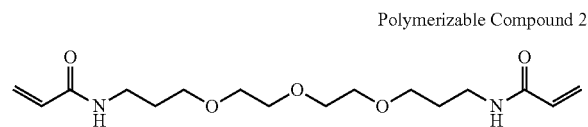 [SMILES: C=CC(=O)NCCCOCCOCCOCCCNC(=O)C=C]

<Preparation of Treatment Liquid 1>

The respective materials were mixed according to the following composition, thereby preparing treatment liquid 1.

The viscosity, surface tension, and pH (25° C.±1° C.) of treatment liquid 1 were as follows. The viscosity was 2.5 mPa·s, the surface tension was 40 mN/m, and the pH was 1.0. The surface tension was measured using AUTOMATIC SURFACE TENSIOMETER CBVP-Z (trade name, manufactured by Kyowa Interface Science Co., Ltd.), the viscosity was measured using DV-III ULTRA CP (trade name, manufactured by Brookfield Engineering Lab, Inc.), and the pH was measured using PH METER HM-30R (trade name, manufactured by DKK-TOA CORPORATION).

"Composition of Treatment Liquid 1"

| | |
|---|---|
| Malonic acid (manufactured by Wako Pure Chemical Industries, Ltd.) | 25.0% |
| Diethylene glycol monomethyl ether (manufactured by Wako Pure Chemical Industries, Ltd.) | 20.0% |
| EMULGEN P109 (trade name, manufactured by Kao Corporation; nonionic surfactant) | 1.0% |
| Ion exchanged water | Remainder, making 100% in total |

Example 1

Preparation of Black Ink Composition K1

The respective materials were mixed according to the following composition, and then the mixture was subjected to filtration using a glass filter (trade name: GS-25, manufactured by ADVANTEC MFS, INC.), followed by filtration using a PVDF membrane filter (manufactured by Millipore Corporation; pore diameter of 5 μm), to obtain black ink composition K1.

"Composition of Black Ink Composition K1"

| | |
|---|---|
| Carbon black dispersion K1 | 20 parts |
| Polymerizable compound 2 | 19 parts |
| IRGACURE 2959 (trade name, manufactured by BASF Japan Ltd.; photopolymerization initiator) | 3 parts |
| OLFINE E1010 (trade name, manufactured by Nissin Chemical Industry Co., Ltd.; surfactant) | 1 part |
| Ion exchanged water | Remainder, making 100 parts in total |

The black ink composition K1 obtained as described above was diluted 5,000-fold with distilled water, and the absorbance at a wavelength of 350 nm and the absorbance at a wavelength of 600 nm were measured using an ultraviolet-visible-infrared spectrophotometer V-570 (trade name, manufactured by JASCO Corporation). Then, the ratio of these absorbances (absorbance at a wavelength of 350 nm/absorbance at a wavelength of 600 nm) was determined. The evaluation results are shown in Table 1.

With regard to the black ink composition K1 obtained as described above, the volume average particle diameter was measured using a particle size distribution measuring apparatus NANOTRAC UPA-EX150 (trade name, manufactured by Nikkiso Co., Ltd.) in accordance with a dynamic light scattering method. The volume average particle diameter was found to be 113 nm.

<Image Formation and Evaluation>

An inkjet head was prepared, and the storage tank connected to the inkjet head was refilled with black ink composition K1 obtained as described above. A sheet of "TOKUBISHI ART PAPER" (trade name, manufactured by Mitsubishi Paper Mills, Ltd.; basis weight of 104.7 g/m²) that served as a recording medium was cut into A5 size, and fixed on a stage that was movable in a predetermined linear direction at a velocity of 500 mm/sec. The temperature of the stage was kept at 30° C. Treatment liquid 1 obtained as described above was coated on the recording medium using a bar coater such that the thickness was about 1.2 μm, and dried at 50° C. for 2 seconds immediately after coating.

After that, a solid image was printed as follows. The inkjet head was fixed and arranged such that the direction of the line head where nozzles were arranged (main scanning direction) was inclined at an angle of 75.7 degrees with respect to the direction perpendicular to the moving direction of the stage (subscanning direction). While moving the recording medium at a constant speed along the subscanning direction, the ink was ejected onto the entire surface of the recording medium by a line system under ejection conditions of an ink droplet amount of 2.8 pL, an ejection frequency of 25.5 kHz, and a resolution of 1200 dpi×1200 dpi.

After the image recording was completed, the recording medium onto which the black ink composition had been applied was dried by applying a flow of hot air at a temperature of 120° C. and at a rate of 5 m/sec to the surface onto which the ink was ejected for 15 seconds using a blower, while heating with an infrared heater from a side of the recording medium opposite to the surface onto which the ink was ejected (rear surface).

After drying, the image was irradiated with UV light (using a metal halide lamp manufactured by EYE GRAPHICS Co., Ltd.; maximum irradiation wavelength of 365 nm) such that the total irradiation level was 0.8 J/cm², to cure the image. In this way, a print sample was obtained.

(Evaluation of Adhesion)

The print sample obtained as described above was left in an environment of 25° C. and 50% RH for 15 minutes. After being left to stand, a piece of cellophane adhesive tape (trade name: LP-12, manufactured by Nichiban Co., Ltd.) with a length of 3 cm was adhered to the surface on which the solid image was printed on the print sample. Then, after 5 seconds, the cellophane tape was peeled off. Thereafter, the sample and the cellophane tape that had been peeled off were visually observed, and were evaluated according to the following evaluation criteria. The evaluation results are shown in Table 1.

—Evaluation Criteria—

A: No color transfer to the tape was observed, and no deterioration of the solid image on the sample was observed.

B: Color transfer to the tape occurred to form two or fewer color spots, but no deterioration of the solid image on the sample was observed.
C: Color transfer was observed at three or more portions of the tape, and slight deterioration of the solid image on the sample was observed.
D: Color transfer to a part of the tape was observed in the shape of a line, and detachment of the solid image from the sample was observed.
E: Color detachment of half of the area of the tape or more was observed, and detachment of the solid image from the sample was observed.
It should be noted that the evaluation criteria D and E indicate practically problematic levels.

dispersions K2 to K5 were used; respectively, instead of using carbon black dispersion K1. Black ink compositions K2 to K5 were evaluated in the same manner as in Example 1. The evaluation results are shown in Table 1.

Comparative Examples 1 to 5

Each of black ink compositions K6 to K10 was prepared in the same manner as in Example 1, except that carbon black dispersions K6 to K10 were used, respectively, instead of using carbon black dispersion K1. Black ink compositions K6 to K10 were evaluated in the same manner as in Example 1. The evaluation results are shown in Table 1.

TABLE 1

| | Carbon Black | | Black Ink Composition | | | | Evaluation | |
|---|---|---|---|---|---|---|---|---|
| | Average Primary Particle Diameter [nm] | BET Specific Surface Area [m²/g] | Ink No. | Absorbance at Wavelength of 350 nm | Absorbance at Wavelength of 600 nm | Absorbance Ratio | Volume Average Particle Diameter [nm] | Adhesion | Rub-off Resistance |
| Example 1 | 24 | 115 | K1 | 0.452 | 0.24 | 1.88 | 113 | C | B |
| Example 2 | 24 | 110 | K2 | 0.454 | 0.244 | 1.86 | 139 | C | A |
| Example 3 | 56 | 45 | K3 | 0.392 | 0.24 | 1.63 | 142 | A | A |
| Example 4 | 27 | 80 | K4 | 0.424 | 0.242 | 1.75 | 125 | B | A |
| Example 5 | 75 | 30 | K5 | 0.331 | 0.238 | 1.39 | 195 | A | C |
| Comparative Example 1 | 17 | 200 | K6 | 0.466 | 0.24 | 1.94 | 113 | E | D |
| Comparative Example 2 | 15 | 320 | K7 | 0.494 | 0.24 | 2.06 | 95 | E | D |
| Comparative Example 3 | 18 | 180 | K8 | 0.508 | 0.238 | 2.13 | 83 | E | D |
| Comparative Example 4 | 25 | 100 | K9 | 0.472 | 0.238 | 1.98 | 103 | D | C |
| Comparative Example 5 | 24 | 125 | K10 | 0.49 | 0.24 | 2.04 | 90 | D | C |

(Evaluation of Rub-Off Resistance)
The print sample of the solid image obtained as described above was left to stand in an environment of 25° C. and 50% RH for 15 hours. Thereafter, the sample of the solid image sample which had been left to stand was superimposed on an unprinted TOPKOTE PLUS (trade name, manufactured by Oji Paper Co., Ltd) sheet (which may be referred to as an unused sample), and the surface of the sample of the solid image was rubbed 10 times with a load of 200 kg/m². Thereafter, the unused sample and the solid image were visually observed, and evaluated in accordance with the evaluation criteria described below. Evaluation results are shown in Table 1.
—Evaluation Criteria—
A: No color transfer to the unused sample was observed, and no deterioration of the rubbed solid image was observed.
B: Color transfer to the unused sample was observed, but no deterioration of the rubbed solid image was observed.
C: Color transfer to the unused sample was observed, and deterioration was observed in a part of the rubbed solid image.
D: Color transfer to the unused sample was observed, and deterioration was observed in half or more of the area of the rubbed solid image.
*It should be noted that the evaluation criteria D indicates a practically problematic level.

Examples 2 to 5

Each of black ink compositions K2 to K5 was prepared in the same manner as in Example 1, except that carbon black From Table 1, it is understood that it was possible to form an image having excellent adhesion and excellent rub-off resistance by forming an image using the black ink composition of the present invention.

According to the present invention, a black ink composition which can form an image having excellent rub-off resistance and excellent adhesion to recording media, and an ink set including the black ink composition is provided.

Further, according to the present invention, an image forming method capable of forming an image having excellent rub-off resistance and excellent adhesion to recording media using the ink set is provided.

Embodiments of the present invention include, but are not limited to, the following.

<1> A black ink composition comprising a resin-coated carbon black containing a water-soluble resin and carbon black, a water-soluble polymerizable compound, a polymerization initiator, and water, wherein an average primary particle diameter of the carbon black is 20 nm or more, and an absorbance ratio of absorbance at a wavelength of 350 nm with respect to absorbance at a wavelength of 600 nm (absorbance at a wavelength of 350 nm/absorbance at a wavelength of 600 nm), when the black ink composition is diluted 5,000-fold with water, is 1.9 or lower.

<2> The black ink composition according to <1>, wherein the average primary particle diameter of the carbon black is 25 nm or more, and the absorbance ratio is 1.8 or lower.

<3> The black ink composition according to <1> or <2>, wherein at least a portion of a surface of the carbon black is covered with a crosslinked water-soluble resin in the resin-coated carbon black.

<4> The black ink composition according to any one of <1> to <3>, wherein the water-soluble resin comprises a structural unit derived from at least one of benzyl (meth)acrylate or phenoxyethyl (meth)acrylate and a structural unit derived from (meth)acrylic acid.

<5> The black ink composition according to any one of <1> to <4>, wherein a volume average particle diameter of the resin-coated carbon black is from 80 nm to 200 nm.

<6> The black ink composition according to any one of <1> to <5>, wherein the polymerization initiator is a compound represented by the following Formula (1):

Formula (1)

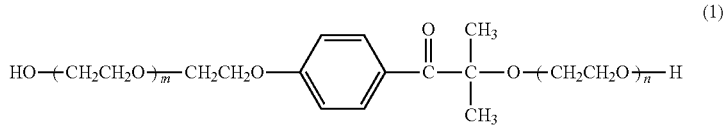

wherein, in Formula (1), m and n each independently represent an integer of 0 or more, and m+n represents an integer of from 0 to 3.

<7> The black ink composition according to any one of <1> to <6>, further comprising an acetylene glycol surfactant.

<8> An ink set comprising:
the black ink composition according to any one of <1> to <7>; and
a treatment liquid including an aggregating agent that is capable of forming an aggregate when contacting the black ink composition.

<9> The ink set according to <8>, wherein the aggregating agent comprises an acidic compound.

<10> An image forming method comprising:
providing the ink set according to <8>;
applying the treatment liquid in the ink set onto a recording medium;
applying the black ink composition in the ink set onto the recording medium by an inkjet method; and
irradiating the black ink composition applied onto the recording medium with an actinic energy ray.

All publications, patent applications, and technical standards mentioned in this specification are herein incorporated by reference to the same extent as if each individual publication, patent application, or technical standard was specifically and individually indicated to be incorporated by reference.

What is claimed is:

1. A black ink composition comprising a resin-coated carbon black containing a water-soluble resin and carbon black, a water-soluble polymerizable compound, a polymerization initiator, and water, wherein
an average primary particle diameter of the carbon black is 20 nm or more, and
an absorbance ratio of absorbance at a wavelength of 350 nm with respect to absorbance at a wavelength of 600 nm (absorbance at a wavelength of 350 nm/absorbance at a wavelength of 600 nm), when the black ink composition is diluted 5,000-fold with water, is 1.9 or lower, and
the absorbance at a wavelength of 350 nm when the black ink composition is diluted 5,000-fold with water is from 0.3 to 0.46.

2. The black ink composition according to claim 1, wherein the average primary particle diameter of the carbon black is 25 nm or more, and the absorbance ratio is 1.8 or lower.

3. The black ink composition according to claim 1, wherein at least a portion of a surface of the carbon black is covered with a crosslinked water-soluble resin in the resin-coated carbon black.

4. The black ink composition according to claim 1, wherein the water-soluble resin comprises a structural unit derived from at least one of benzyl (meth)acrylate or phenoxyethyl (meth)acrylate and a structural unit derived from (meth)acrylic acid.

5. The black ink composition according to claim 1, wherein a volume average particle diameter of the resin-coated carbon black is from 80 nm to 200 nm.

6. The black ink composition according to claim 1, wherein the polymerization initiator is a compound represented by the following Formula (1):

Formula (1)

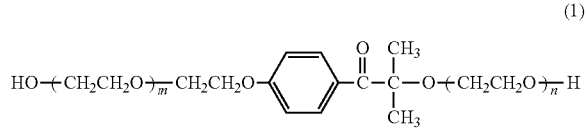

wherein, in Formula (1), m and n each independently represent an integer of 0 or more, and m+n represents an integer of from 0 to 3.

7. The black ink composition according to claim 1, further comprising an acetylene glycol surfactant.

8. An ink set comprising:
the black ink composition according to claim 1; and
a treatment liquid including an aggregating agent that is capable of forming an aggregate when contacting the black ink composition.

9. The ink set according to claim 8, wherein the aggregating agent comprises an acidic compound.

10. An image forming method comprising:
providing the ink set according to claim 8;
applying the treatment liquid in the ink set onto a recording medium;
applying the black ink composition in the ink set onto the recording medium by an inkjet method; and
irradiating the black ink composition applied onto the recording medium with an actinic energy ray.

11. The black ink composition of claim 1, wherein a content of the water is from 30% by mass to 80% by mass with respect to the black ink composition.

* * * * *